United States Patent
Lakshmanan et al.

(10) Patent No.: US 11,924,241 B1
(45) Date of Patent: Mar. 5, 2024

(54) REAL-TIME MITIGATIVE SECURITY ARCHITECTURE

(71) Applicant: Lookout, Inc., Boston, MA (US)

(72) Inventors: Meenakshi Sundaram Lakshmanan, San Jose, CA (US); Balaji Prasad, San Jose, CA (US); Brian James Buck, Livermore, CA (US); Tyler S. Croak, Columbia, MD (US)

(73) Assignee: Lookout, Inc., Boston, MA (US)

( * ) Notice: Subject to any disclaimer, the term of this patent is extended or adjusted under 35 U.S.C. 154(b) by 0 days.

(21) Appl. No.: 18/475,012

(22) Filed: Sep. 26, 2023

(51) Int. Cl.
*H04L 9/40* (2022.01)

(52) U.S. Cl.
CPC ...... *H04L 63/1433* (2013.01); *H04L 63/1416* (2013.01); *H04L 63/1466* (2013.01)

(58) Field of Classification Search
CPC ............ H04L 63/1433; H04L 63/1416; H04L 63/1466
See application file for complete search history.

(56) References Cited

U.S. PATENT DOCUMENTS

| | | | | |
|---|---|---|---|---|
| 8,918,883 B1 * | 12/2014 | Boyle | ................... | G06F 21/577 726/25 |
| 8,925,092 B1 * | 12/2014 | Johansson | ................. | G06F 8/61 726/25 |
| 9,386,463 B1 * | 7/2016 | Contino | ................ | H04W 12/00 |
| 9,609,460 B2 | 3/2017 | Sinha | | |
| 11,159,546 B1 * | 10/2021 | Moore | ................ | H04L 63/0245 |
| 11,489,878 B2 | 11/2022 | Sinha et al. | | |
| 2016/0099963 A1 * | 4/2016 | Mahaffey | .............. | G06F 21/554 726/25 |
| 2020/0304503 A1 | 9/2020 | Zerrad et al. | | |
| 2021/0144165 A1 * | 5/2021 | Palumbo | ............... | H04L 63/145 |
| 2021/0409441 A1 * | 12/2021 | Singh | .................. | H04L 63/1433 |

(Continued)

FOREIGN PATENT DOCUMENTS

| | | | | |
|---|---|---|---|---|
| EP | 2800024 B1 * | 2/2019 | .......... | G06F 21/552 |
| KR | 102420884 B1 * | 7/2022 | ............. | G06F 21/56 |

(Continued)

OTHER PUBLICATIONS

Wikipedia, "Network Access Control." Retrieved from the Internet on Aug. 10, 2023 <https://en.wikipedia.org/wiki/Network_Access_Control>, 2023.

*Primary Examiner* — Sarah Su
(74) *Attorney, Agent, or Firm* — Greenberg Traurig

(57) ABSTRACT

Systems, methods, and apparatus related to network security. In one approach, various endpoint devices communicate with a network gateway and/or API mode CASB over one or more networks. All communications by the endpoint devices with remote servers and clouds pass through the network gateway (and/or by cloud service access when using an API mode CASB). The gateway and/or CASB gathers metadata from the endpoint devices and/or network devices. The metadata indicates characteristics of the communications by the endpoint devices on the networks and/or processes running on the endpoint devices. The gateway and/or CASB identifies security risks using at least the metadata, and in response dynamically performs remediation actions for one or more of the networks in real-time to limit or block propagation of a cyber attack associated with one or more of the identified security risks.

21 Claims, 8 Drawing Sheets

(56) References Cited

U.S. PATENT DOCUMENTS

2023/0069738 A1* 3/2023 Sreedhar ............... H04L 63/101
2023/0269272 A1* 8/2023 Dambrot ............. H04L 63/1408
  726/22

FOREIGN PATENT DOCUMENTS

WO    WO-2017083435 A1 *  5/2017  ............. G06F 11/00
WO    WO-2022089765 A1 *  5/2022

\* cited by examiner

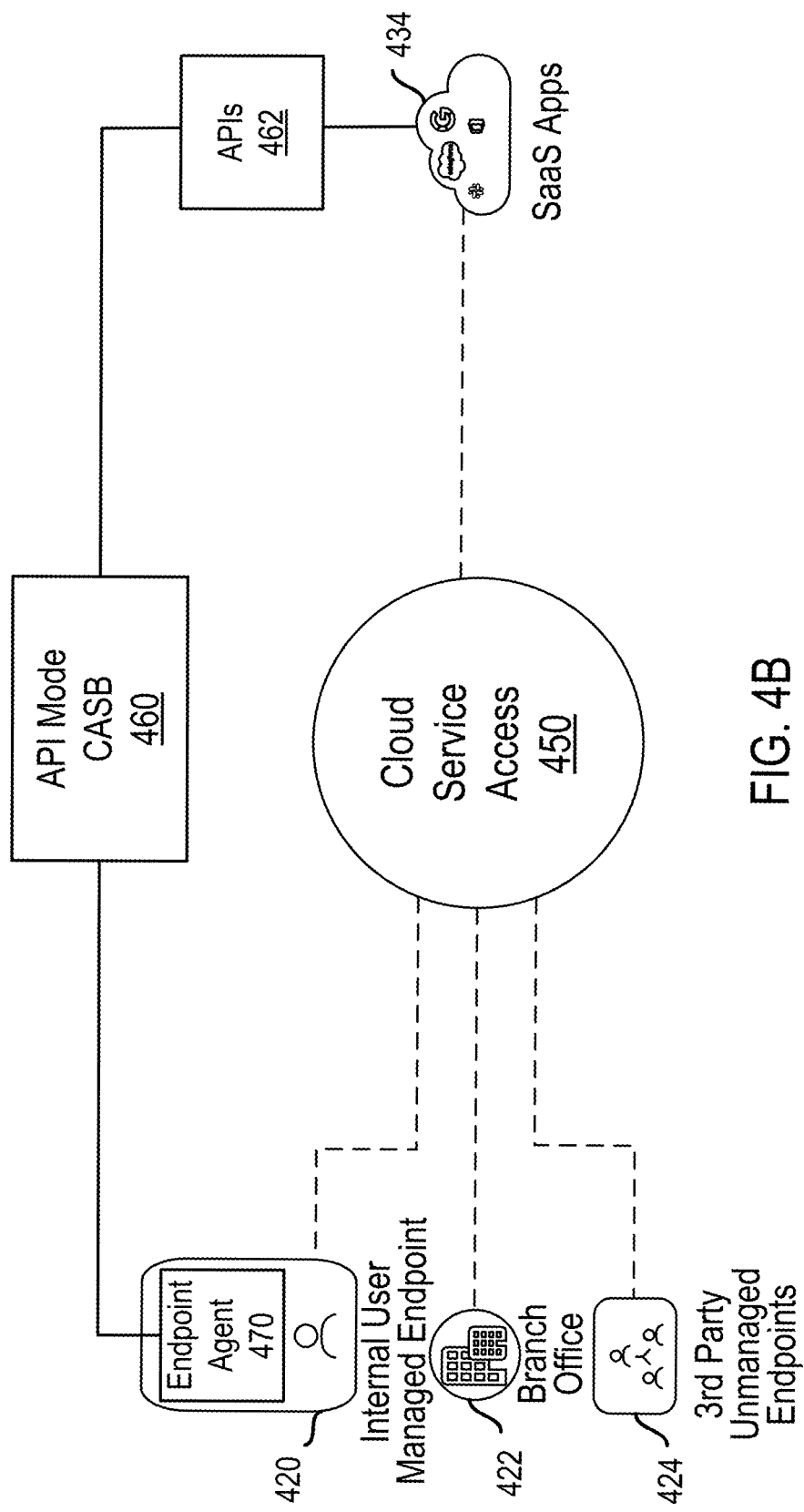

REAL-TIME MITIGATIVE SECURITY ARCHITECTURE

FIELD OF THE TECHNOLOGY

At least some embodiments disclosed herein relate to network security in general, and more particularly, but not limited to a security architecture for dynamically mitigating identified security risks.

BACKGROUND

Cyber attacks have emerged to be one of the most critical problems of the 21st Century. Cyber attacks in modern times have not only affected enterprises and individuals, but also have disabled government infrastructure. This has affected the world not only on a monetary and financial level, but also impacts military defense and even may cause loss of life.

Cyber attacks can occur in one form as malicious software that is unknowingly downloaded onto endpoint devices by an unsuspecting user. The endpoint devices connect to networked resources that are subject to attack. For example, vulnerabilities can exist in software that is loaded onto endpoint devices with network connectivity. Applications installed on endpoint devices can be used as a medium to attack a network. The applications may include vulnerabilities that expose the endpoint device itself to attacks. Also, a third-party may be able to gain unauthorized access to one or more areas within the network. For example, a third-party may exploit a software vulnerability to gain unauthorized access to email accounts and/or data files.

In some cases, software vulnerabilities are addressed through updates to endpoint applications (e.g., software patches). However, prior to the installations of such updates, endpoint devices on a network can be targeted for attack through software vulnerabilities and/or by exploits (e.g., malicious computer code that attempts to acquire sensitive information, or attack normal operations of a network device and/or an entire enterprise network by taking advantage of a vulnerability).

In one example, malware may be embedded in mobile applications (e.g., applications downloaded by an endpoint device from an application store that compromises the endpoint device or its operating environment). For example, an application downloaded (e.g., installed) on an endpoint device (e.g., mobile device, a laptop, a personal computer, tablet, wearable, phablet, Iot device etc.) may include one or more vulnerabilities that enable the creator and/or distributor of the mobile application to access one or more storage areas of the endpoint device (e.g., contact list or passwords) or a network device connected to the endpoint device.

Malware within an endpoint application may negatively impact an endpoint device, an enterprise network to which the endpoint device is connected, and/or other endpoint devices connected to the enterprise network in a negative or anomalous manner.

Various approaches have emerged to handle security risks such as cyber attacks. For example, secure access service edge (SASE) can be used to provide security (using security service edge) and other services. Security service edge (SSE) is the security stack of SASE (that also includes a networking stack including SD-WAN). An SSE stack of cloud security services can allow organizations to protect their workforce from internet threats, provide secure and adaptive access to private corporate applications, and protect data across all their cloud platforms and applications.

SSE typically may include one or more core services as part of the SSE stack. These include, for example, the following services: Secure Web Gateway (SWG) protects a workforce and devices from all internet-based threats. Zero Trust Network Access (ZTNA) protects access to private apps, whether they are in a data center or hosted in the cloud. Cloud Access Security Broker (CASB) protects data stored in multi-cloud environments.

More specifically, SASE or Secure Access Service Edge is an architecture that allows networking and security services to be consumed using a unified control and a unified management plane. The networking and the security services delivered using this architecture focus on delivering a better end user experience, helping improve security posture, while reducing the cost and complexity for IT teams.

SASE can have two parts: A Networking Services or WAN Edge part includes SD-WAN delivering WAN optimization, Quality of Service (QoS) and direct access from branch office locations to the internet. A Security Services or SSE part includes SWG, CASB, and/or ZTNA delivering a unified platform for delivering consistent security policies, and protecting users, data and access to applications with the same solution.

A secure web gateway (SWG) is a security solution that prevents unsecured internet traffic from entering an internal network of an organization. A secure web gateway can be implemented to include one or more firewalls. The SWG is used by organizations to protect their employees and users from accessing and being infected by malicious web traffic, websites with vulnerabilities, internet-borne viruses, malware, and other cyberthreats. It also ensures the implementation and compliance of the organization's compliance standards to protect their confidential information from being exposed.

A cloud access security broker (CASB) is cloud-delivered software or on-premises software and/or hardware that acts as an intermediary between users and cloud service providers. The ability of CASBs to address gaps in security extends across software-as-a-service (SaaS), platform-as-a-service (PaaS), and infrastructure-as-a-service (IaaS) environments. In addition to providing visibility, a CASB also allows organizations to extend the reach of security policies from their existing on-premises infrastructure to the cloud and create new policies for cloud-specific contexts.

CASBs have become a part of enterprise security, allowing businesses to safely use the cloud while protecting sensitive corporate data. The CASB serves as a policy enforcement center, consolidating multiple security policy enforcement functions and applying them to uses in the cloud—regardless of the kind of device attempting to access it, including unmanaged smartphones and personal laptops.

Zero Trust Network Access (ZTNA) enforces granular, adaptive, and context-aware policies for providing secure and seamless Zero Trust access to private apps hosted across clouds and corporate data centers, from any remote location and from any device. That context can be a combination of user identity, user or service location, time of the day, type of service, and security posture of the device.

ZTNA allows "least privilege" access to specific apps, and not the entire underlying network to any user with valid login keys, reducing the attack surface and preventing lateral movement of threats from compromised accounts or devices. ZTNA builds upon the concept of "Zero Trust", that asserts that organizations shouldn't trust any entity, whether inside or outside the security perimeters, and instead must verify every user or device before granting them access to sensitive resources, ensuring data safety and integrity.

ZTNA is one of the components for Secure Service Edge (SSE), transforming a security perimeter from static, enterprise data centers to a more dynamic, policy-based, cloud-delivered edge, to support the access requirements of a remote workforce.

Traditionally, the security of an organization has been dealt in a siloed fashion using multiple vendor products deployed in a data center. With an acceleration to cloud, and workforce becoming hybrid, the traditional approach often does not meet the requirements of modern day work style because of the following: The traditional Castle and Moat architecture requires all traffic to be backhauled to a data center, adding latency and resulting in poor end user experience. It requires extensive management, including maintenance, administration, and new deployments. It does not provide sufficient visibility and monitoring of work-related end user traffic and actions.

Some benefits of SSE include the following: A complete and unified stack of security services that allows customers to provide a secure and productive environment for a hybrid workforce. Also, SSE can be implemented as a cloud native service. As a cloud native service, SSE sits inline with applications in the cloud and does not require backhauling, delivering a real time end user experience.

SSE also can be implemented as a single proxy solution that helps protect corporate data stored across multiple cloud platforms. As all the corporate traffic goes through the single proxy solution, SSE helps identify Shadow IT and empowers end users to use sanctioned applications securely. SSE also can be used to inspect all incoming and outgoing internet traffic (e.g., for stopping internet-based threats like ransomware).

An SSE platform may have various exemplary use cases. For example, SSE can allow secure web and cloud usage that allows users to securely access information they need, whether it is general internet access or corporate applications hosted in the cloud, or delivered as SaaS. A unified policy framework helps protect these users from internet based threats like ransomware, as well as protect corporate information stored across various cloud, SaaS and private applications.

SSE can prevent policy misconfigurations and mitigate risk as a result of human error or policy mismatches in the cloud. SSE can detect and mitigate threats by allowing an IT department to discover any unauthorized activities by users in terms of using unsanctioned SaaS apps to share corporate information. This enables IT to secure these apps and allow users to continue using these apps while following proper security practices.

SSE can allow discovery and remediation of malicious content by inspecting all incoming and outgoing internet traffic and preventing harm to corporate networks including stealing of sensitive information. SSE can prevent unauthorized access to apps based on adaptive access policies that are based on a user's risk, device posture and user location.

SSE can connect and secure remote workers, and provide users the flexibility to use any device from any location with agent-based and agentless access to private apps. SSE can protect remote workers from internet-based threats like ransomware and phishing attacks.

SSE can identify and protect sensitive information. Sensitive information can be discovered automatically with inline controls which allows enforcement of security policies on the fly, and prevents exposure of sensitive data in real time.

BRIEF DESCRIPTION OF THE DRAWINGS

The embodiments are illustrated by way of example and not limitation in the figures of the accompanying drawings in which like references indicate similar elements.

FIG. 4B shows an API mode cloud access security broker (CASB) that uses data collected from one or more APIs to identify security risks, in accordance with some embodiments.

DETAILED DESCRIPTION

Figure 1:
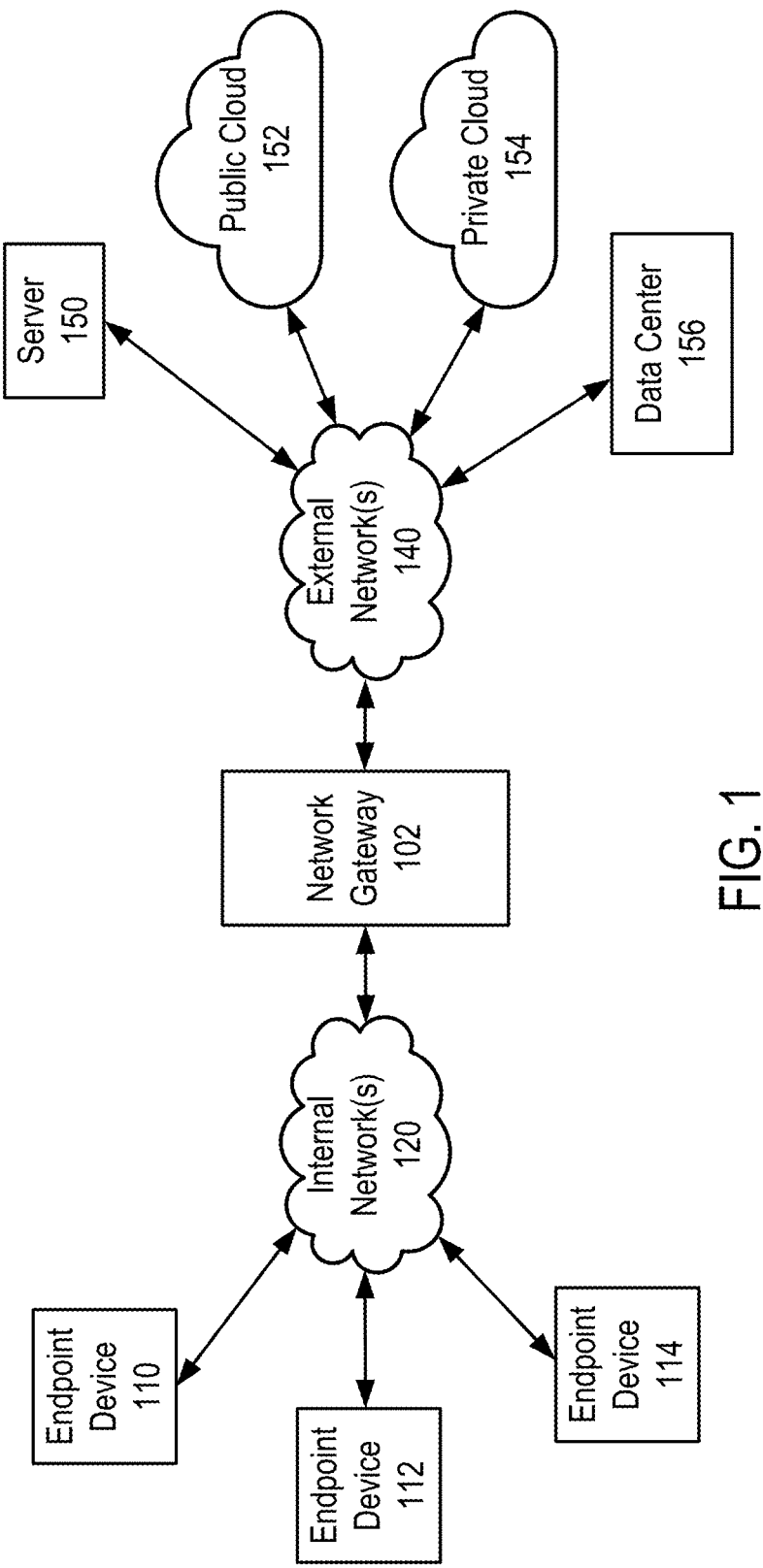
FIG. 1 shows endpoint devices communicating with remote computing devices through a network gateway that identifies security risks, in accordance with some embodiments.

The following disclosure describes various embodiments for a security architecture for dynamically mitigating identified security risks. At least some embodiments herein relate to a network gateway that gathers metadata from various endpoint devices and/or network devices. The metadata gathered by the network proxy is used to identify security risks. Monitoring of the gathered metadata and remediation of identified security risks are performed in real-time (e.g., a remediation action is initiated or performed by an endpoint device and/or network device in less than 1-3 seconds from identification of the security risk, and in some cases less than 500 milliseconds). Remediation is performed granularly on a process-by-process and/or device-by-device basis so that other processes are not negatively impacted.

In general, the network gateway is a device that provides a connection between networks (e.g., a private network and a public network). In one example, the network gateway is a computing device that connects internal and external networks by translating communications from one protocol to another. In one example, the network gateway performs protocol conversions to connect networks with different network protocols. In one example, the network gateway connects an office or home intranet to the Internet. In one example, in enterprise networks, a network gateway can act as a proxy server and/or provide firewall as a service. The proxy server can provide a forward and/or reverse proxy.

There are hundreds of various cyber security products and services that address cyber attacks and cyber security problems in a variety of different ways. However, by the time these products realize and take action, significant damage can already have been done by a cyber attack and malware. The malware and attack can spread across applications, cloud, endpoint, network, and premises, resulting in loss of valuable data and confidential information.

While there are point solutions that can take actions to prevent the spread of malware, the response is not coordinated across the network. For example, if there is malware identified at an endpoint, current solutions potentially prevent spread of malware only on the endpoint side.

While there are several services and offerings currently available where a human being looking into a cyber attack looks into security information and event management (SIEM), figures out playbooks, and identifies actions (e.g., such as using telemetry data), none of this is done seamlessly in real-time in coordination with and across network assets (e.g., cloud, endpoint and/or network). For example, by the time a human takes these actions, significant time has passed (e.g., at least 30 mins), and the cyber attack has already penetrated into various endpoints, cloud, applications in a way that results in loss of data, etc. Thus, the responsiveness of existing solutions is not adequate to timely respond to identified security risks.

To address these and other technical problems, a network gateway gathers metadata from various endpoint devices (e.g., mobile devices) and/or network devices (e.g., routers, switches, servers, or firewalls) and identifies security risks. In one embodiment, one or more computing devices (e.g., servers) are configured as a network gateway for endpoint devices on a network. In one example, the computing devices are servers in a public cloud, and the network gateway runs on one or more virtual machines in a cloud computing environment (sometimes referred to herein as simply a "cloud"). The endpoint devices communicate with various remote computing devices (e.g., data center, public and private clouds) through the network gateway. In one embodiment, in addition to providing the foregoing gateway functionality, the network gateway acts as a proxy (forward and/or reverse) for endpoint devices in a private network of an enterprise, and/or provides firewall as a service for the endpoint devices.

At least one computing device provides a communication interface to the network (e.g., a listening interface to collect metadata from the network). The interface is configured to communicate over the network with the endpoint devices. Each endpoint device runs an endpoint agent that collects metadata regarding a context of its corresponding endpoint device. Each endpoint agent gathers metadata associated with its respective endpoint device and sends the gathered metadata to the network gateway for evaluation and monitoring.

In one embodiment, the network gateway receives, from a first endpoint agent, first metadata corresponding to a first endpoint device. The network gateway identifies, based at least on the first metadata, a security risk. In response to identifying the security risk, the network gateway performs at least one security action.

The security action includes, for example, limiting or blocking of at least one process associated with the identified security risk. For example, the process is limited or blocked on the first endpoint device and one or more other endpoint devices (e.g., to block lateral movement of the security risk to other endpoint devices).

In one embodiment, the network gateway is configured as an SSE remediation engine that integrates and coordinates enforcement of security actions. The SSE remediation engine is a software component within an SSE proxy solution (forward or reverse) that takes remediative actions based on the detection of various signals from inspection of traffic flowing through the proxy and/or observed events (e.g., events happening on a user's client device) as detected by a software component (e.g., an endpoint agent) running on that user client device.

In one embodiment, the SSE remediation engine consists of an endpoint remediation engine and a network remediation engine. The endpoint remediation engine has the job of detection of events, and when it detects events, it may notify some other device, and/or it may initiate an action. Actions are taken by the network remediation action engine. In one example, malware can be detected by the endpoint remediation engine, which can decide that further action should be taken by the network remediation engine.

The security actions are performed dynamically and in real-time in such a way that both the network (e.g., network devices) and endpoint devices act as sensors as well as enforcement points working in tandem. For example, network devices and/or endpoint devices act as sensors to collect metadata that is used to identify security risks. Then, the same or different network devices and/or endpoint devices act as enforcement points to perform security actions (e.g., limit or block one or more specific processes).

In one embodiment, the SSE remediation engine can take action, for example, in 10-50 milliseconds from security risk detection and can stop or minimize the adverse impact of a cyber attack. The SSE remediation engine detects malicious activity/malware at an endpoint device and takes action at the network level (e.g., on a network device and/or a different endpoint device).

In one embodiment, if malware is downloaded at a first endpoint device using a connection, the SSE remediation engine detects this security risk and stops the connection from that first endpoint device. In addition, the SSE remediation engine also determines that other endpoint devices have downloaded the same or similar malware. In response, the SSE remediation engine stops traffic flowing from the first and the other endpoint devices. In one example, the traffic is stopped in 1-10 seconds from identifying any impacted endpoint device.

In one embodiment, the SSE remediation engine is a software component configured within an SSE proxy solution (forward or reverse). In one example, an SSE platform includes SWG, CASB, and ZTNA with the SSE remediation engine. In one example, the platform implements a CASB architecture that provides API, SAML proxy, forward proxy, active-sync proxy, and/or reverse proxy.

The SSE remediation engine takes remediation actions based on the detection of various signals from inspection of traffic flowing through the SSE remediation engine (e.g., forward proxy) and/or events observed by SSE remediation engine that are happening on an endpoint device (e.g., user's client device). The events are as detected by a software component (e.g., endpoint agent) running on the user's client device.

In one embodiment, the SSE remediation engine consists of a detection engine and remediation action engine. The SSE remediation engine has the job of detection of events, and when it detects events, it may notify another process or device, and/or it may take an action. Actions are taken by the remediation portion of the engine. So, for example, malware can be detected in endpoint remediation. But the SSE remediation engine may decide that the security action to be taken should be taken by the network remediation engine.

In one embodiment, as soon as an SSE remediation engine determines that a specific series of cyber events points to an advanced attack or a data exfiltration attempt, the SSE remediation engine makes targeted queries on one or more endpoint devices to determine which process is participating in the attack or attempt. For example, the queries relate to what kind of process that specific endpoint device is performing. For example, the query relates to what kind of files the endpoint device is accessing, what kind of data it is transmitting, socket connections it is opening, what kind of traffic it is sending out, etc. Based on these queries, the SSE remediation engine is able to close the affected connection(s), and mitigate any exfiltration attempts.

In one embodiment, both the SSE remediation engine and endpoint devices act as sensors and enforcement points at the same time. For example, as soon as the exfiltration attempt is discovered by the SSE remediation engine, the SSE remediation engine determines the particular endpoint device(s) for which a connection and/or communication is used to communicate with unauthorized command and control channels. The SSE remediation engine also can detect the usage of communications to newly-created domains (e.g., as in Domain Generation Algorithm—DGA). In one example, domain generation algorithms (DGA) are seen in various families of malware that are used to periodically generate a large number of domain names that can be used as rendezvous points with their command and control servers.

In one example, the SSE remediation engine above can also detect tunneling of traffic via DNS queries. DNS queries are another method for unauthorized communication to command and control servers that is not dealt with via domain reputation solutions. The SSE remediation engine may also determine that a file is being downloaded which is identified as being malicious.

In one embodiment, several endpoint devices are exfiltrating data and this activity is caught by Data Loss Prevention (DLP) capabilities in the SSE remediation engine. In this case, the SSE remediation engine acts as a sensor. As soon as the SSE remediation engine detects this activity, the SSE remediation engine connects each of one or more endpoint devices to a software agent, correlates endpoint device and network telemetry (e.g., process information and outbound connections), surfaces malicious activity, and determines potential exfiltration attempts from this data. The SSE remediation engine then takes the network metadata (e.g., what is the source code, what is the destination IP address) of that malicious connection that is discovered and then makes one or more queries using that metadata on the endpoint device(s) running an application or process that is in charge of those connections. Regardless of the status of the endpoint device(s) (e.g., agent is disabled, proxy autoconfig (PAC) file removed), the SSE remediation engine can detect exfiltration attempts.

Existing cyber security offerings can generally be categorized in two hemispheres. The first hemisphere is a compliance (hardening) hemisphere and the second is a threat detection hemisphere. The products that may do compliance well are not good in threat detection. Additionally, the products that may do threat detection well are not hardened. The SIEM offerings attempt to join collected data and determine (e.g., via capabilities such as XDR) that there is an advanced attack happening. However, use of the foregoing existing offerings is time consuming and sometimes takes hours (or even days) to properly handle a cyber attack. By the time sufficient actions may be taken, the cyber attacker has penetrated into and/or damaged devices, applications, data, etc.

In contrast, various advantages are provided by embodiments of the network gateway described herein. In one advantage, network and/or device remediation can be done autonomously (without human intervention) and in real-time so that a cyber attacker's capability to infiltrate can be minimized. Simultaneously with enforcement on the network, enforcement is also brought to the endpoint device(s) (e.g., by locking that particular endpoint device if needed). This is a significant improvement over prior approaches. The SSE remediation engine can take coordinated integrated action in real-time.

FIG. 1 shows endpoint devices 110, 112, 114 communicating with various remote computing devices through a network gateway 102 that identifies security risks, in accordance with some embodiments. In one example, the remote computing devices include server 150, public cloud 152, private cloud 154, and/or data center 156. The remote computing devices generally include any computing device that communicates over a network. For example, in some cases, the remote computing devices provide services to the endpoint devices. In one example, the services include software as a service and/or infrastructure as a service.

The endpoint devices communicate with network gateway 102 through one or more internal networks 120. For example, internal networks 120 can include wireless networks, local area networks, secure tunnels, and/or wide area networks.

Network gateway 102 acts as a gateway for communications between the endpoint devices and the remote computing devices. By acting as a gateway, network gateway 102 can perform security risk evaluation and/or control communications by any given endpoint device with the remote computing devices and/or any other computing devices (e.g., network devices associated with internal network 120). In one embodiment, network gateway 102 controls communications and/or other functions of each endpoint device using an endpoint agent installed on the endpoint device.

In one embodiment, network gateway 102 is able to examine traffic at every one of layers 3 to 7 of the OSI stack (e.g., including encrypted traffic such as TLS encrypted traffic). In one example, the examination is performed using conventional man-in-the-middle techniques. In one example, the network gateway inspects https encrypted traffic using conventional TLS interception techniques.

The endpoint devices communicate through network gateway 102 with the remote computing devices using one or more external networks 140. For example, external networks 140 can include wireless networks, local area networks, secure tunnels, and/or wide area networks.

In one example, network gateway 102 is implemented in a cloud computing environment (e.g., Amazon Web Services (AWS) or Microsoft Azure) on one or more virtual machines. In one example, network gateway 102 is implemented on a computing device in the same premises as one or more of the endpoint devices and/or network devices associated with internal networks 120.

In one example, a computing environment operates in conjunction with embodiments of network gateway 102. The components of the computing environment may be implemented using any desired combination of hardware and software components.

An exemplary computing environment may include endpoint devices each configured as a client computing device. The computing environment may also include a provider server, an authentication server, and/or a cloud component, which communicate with each other over a network (e.g., network 120).

The client computing device may be any computing device such as desktop computers, laptop computers, tablets, PDAs, smart phones, mobile phones, smart appliances, wearable devices, IoT devices, in-vehicle devices, and so on. In one example, the client computing device accesses services at the provider server (e.g., server 150).

The client computing device (e.g., endpoint device 110) may include one or more input devices or interfaces for a user of the client computing device. For example, the one or more input devices or interfaces may include one or more of: a keyboard, a mouse, a trackpad, a trackball, a stylus, a touch screen, a hardware button of the client computing device, and the like. The client computing device may be configured to execute various applications (e.g., a web browser application or mobile app) to access other devices on the network.

The provider server (e.g., server 150) may be any computing device configured to host one or more applications/services. In some embodiments, the provider server may require security verifications before granting access to the services and/or resources provided thereon. In some embodiments, the applications/services may include online services that may be engaged once a device has authenticated its access. In some embodiments, the provider server may be configured with an authentication server for authenticating users and/or devices. In other embodiments, an authentication server may be configured remotely and/or independently from the provider server.

In one example, the network may be any type of network configured to provide communication between components of a cloud system. For example, the network may be any type of network (including infrastructure) that provides communications, exchanges information, and/or facilitates the exchange of information, such as the Internet, a Local Area Network, Wide Area Network, Personal Area Network, cellular network, near field communication (NFC), optical code scanner, or other suitable connection(s) that enables the sending and receiving of information between the components of the cloud system. In other embodiments, one or more components of the cloud system may communicate directly through a dedicated communication link(s).

In various examples, the cloud system may also include one or more cloud components. The cloud components may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.). In some examples, either one or both of the provider server and the authentication server may be configured to operate in or with cloud computing/architecture such as: infrastructure a service (IaaS), platform as a service (PaaS), and/or software as a service (SaaS).

In one example, the endpoint devices and/or other nodes of networks 120, 140 can each be a part of a peer-to-peer network, a client-server network, a cloud computing environment, or the like. Network gateway 102 can operate as a server(s) in a client-server network environment, as a peer machine in a peer-to-peer (or distributed) network environment, and/or as a server or a client machine in a cloud computing infrastructure or environment.

Network gateway 102 evaluates potential security risks based on data gathered from various sources. From this evaluation, network gateway 102 (sometimes referred to simply as a "gateway" herein) can identify one or more security risks. For example, the gathered data can include metadata gathered from the endpoint devices. The gathered data also can include metadata gathered from networks 120. For example, gateway 102 can collect metadata from network devices (not shown) of network 120.

In some cases, metadata can also be collected from external network 140 and/or remote computing devices. For example, an application programming interface (API) of server 150 or public cloud 152 can be a source of data used for security risk evaluation.

When a security risk is identified by gateway 102, one more actions can be performed. In one example, one or more processes associated with the identified security risk are limited or blocked on one or more computing devices. For example, a process running on an endpoint device 110 can be blocked. Gateway 102 can block the same process on another endpoint device 112 or 114, as determined from evaluation of gathered metadata and/or other data evaluation.

In one embodiment, network gateway 102 associates an identified security risk with an application running on an endpoint device 110, 112, and/or 114. Gateway 102 performs one or more actions to cause that application to be isolated/quarantined in one or more various ways.

For example, network connections at the network for the endpoint device are blocked. For example, the endpoint device can have a software component running on the device that performs traffic redirection (e.g., to a forward proxy). This software component can block the network connections by dropping those packets (e.g., not forwarding them through the tunnel to the proxy). The software component can perform this blocking in response to or based on a signal sent from gateway 102.

In another example, the software component can terminate the network connection by inserting a FIN packet back to a program that was attempting the network connection. In one example, the foregoing actions can be taken by a network proxy (e.g., drop the packets or terminate the network connection).

In one example, the network proxy can block the network connection at the time that the originating program is doing a DNS lookup for the domain name of the intended destination host, by, for example, examining the DNS request at the software component running on the device and dropping the DNS request (e.g., not forwarding it to a DNS server). In one example, the network proxy can act locally as the DNS responder and return a NXDOMAIN response to the originating program, thereby blocking any communication. In one example, the network proxy can forward the DNS request to a DNS server associated with the SSE solution which determines to send a NXDOMAIN response because the intended destination host is now on a list of hosts for which communication will not be allowed.

In one embodiment, instead of blocking the network connection for an application (or other process), network gateway 102 initiates one or more actions in which there is a process for the network connection to be partially allowed so as to capture for further investigation content/data which a program on an endpoint client device is trying to send to a server (e.g., a command-and-control or C2 server). There is no connection actually made to the C2 server, but instead either a software component local to the endpoint client device, or the network proxy, captures the data sent.

In some cases, the software component may additionally attempt to respond with actions such as those that the real intended destination host C2 server would have responded with. In one example, this can optionally include what is essentially a "no action" response (e.g., the program running on the user endpoint client device which is attempting to request instructions from the C2 server may receive information that there are no current actions to take from the impersonation process of the C2 server).

In one example, if a program running on an endpoint device is intending or attempting to exfiltrate data from the endpoint device, either a software component running locally on the endpoint device, or the network proxy, can pretend to be the intended destination host exfiltration point, and can capture the data which is being sent by that program for further analysis (e.g., the further analysis can be performed by network gateway 102). In this example, the data is not actually being sent to any real exfiltration point, but rather is being recorded for further analysis by an automated process or a human.

In one embodiment, an application running on one or more endpoint devices is associated with an identified security risk based on evaluation of gathered metadata by network gateway 102. Gateway 102 takes actions to prevent this application from accessing any other files or documents on an endpoint device on which the application is installed and/or running. There are several ways, for example, in which this application can be prevented from accessing any other files or documents on the endpoint device. For example, this can be done by shutting down the application and optionally by preventing it from being restarted. In one example, a shim layer in the file system of the endpoint device (e.g., the notify function on Linux, or a similar function on other operating systems) can be used to prevent that running application from reading, writing, or modifying any part of the file system on the endpoint device. If needed, the application can be quarantined as a remediation action.

In one embodiment, network gateway 102 acts as a detection engine. A security risk is identified by the detection engine based on metadata gathered from endpoint devices and/or network devices. The endpoint devices act as an enforcement point to prevent further harm by any process associated with the security risk.

In one embodiment, network gateway 102 performs remediation actions for identified security risks in a granular fashion. More specifically, limiting or blocking of processes associated with identified security risks is performed granularly so that only the harmful processes are affected. Processes deemed safe and/or unrelated to the security risk are allowed to continue so that endpoint device and/or other network device functionality can continue uninterrupted and/or with minimal or no curtailment of functionality.

In one example, a specific process which is identified as being likely corrupted (e.g., a process determined to be talking to an application/drive by uploading or downloading a file) can be killed without impacting a user's other activities. This can be performed automatically and dynamically under control of network gateway 102. This action helps protect other endpoint devices on a same network, cloud applications, perimeter, remote devices, and can also be instrumental in protecting data.

The identification and remediation of security risks by network gateway 102 is advantageous for remote working environments. For example, between a remote user and a cloud service, there is a series of devices connected with one another to implement various functionality such as authentication framework, proxy, firewall, DLP, content inspection, etc. Network gateway 102 operates in real-time to identify and initiate remediation actions by actuating one or more controls. Actuating these controls in real-time limits the extent of damage that may be caused by malware or other cyber attack.

An advantage of network gateway 102 is its integrated and coordinated capability to significantly reduce remediation time and/or response time. For example, for any data breach, implementing security capabilities that react specifically to an identified security risk in a real-time manner is valuable (e.g., reacting within the first minute of identifying the security risk). For example, as soon as a breach is identified as having occurred, network gateway 102 finds the endpoint and/or network devices that may have been infected. Gateway 102 also identifies applications that may have been infected for use in performing remediation actions.

In one embodiment, network gateway 102 determines characteristics associated with a first endpoint device. These characteristics are communicated to gateway 102 as first metadata. Gateway 102 collects second metadata regarding characteristics of second endpoint devices. Gateway 102 determines whether there is a match between the first and second metadata. For example, if the first and second metadata are similar within a comparison threshold, gateway 102 determines that an identified security risk for the first endpoint device is associated with one or more of the second endpoint devices. Remediation action is then taken for the second endpoint devices.

For example, characteristics discovered in one device are transmitted to gateway 102 to check whether any other device connected to the gateway 102 has programs running or stored on the other device which match the discovered characteristics. For example, the discovered device may be the first device of many infected devices that have been activated as part of a cyber attack and is commencing communication to exfiltrate data. For example, the discovered characteristics (e.g., indicators of compromise) of a program attempting this communication can be used on other devices to identify programs which have infected the other devices (e.g., but may have not yet been activated). In this way, network gateway 102 is part of a cyber security mitigative architecture that dynamically helps prevent adverse effects of cyber attacks, malwares, or viruses in real-time.

Figure 2:
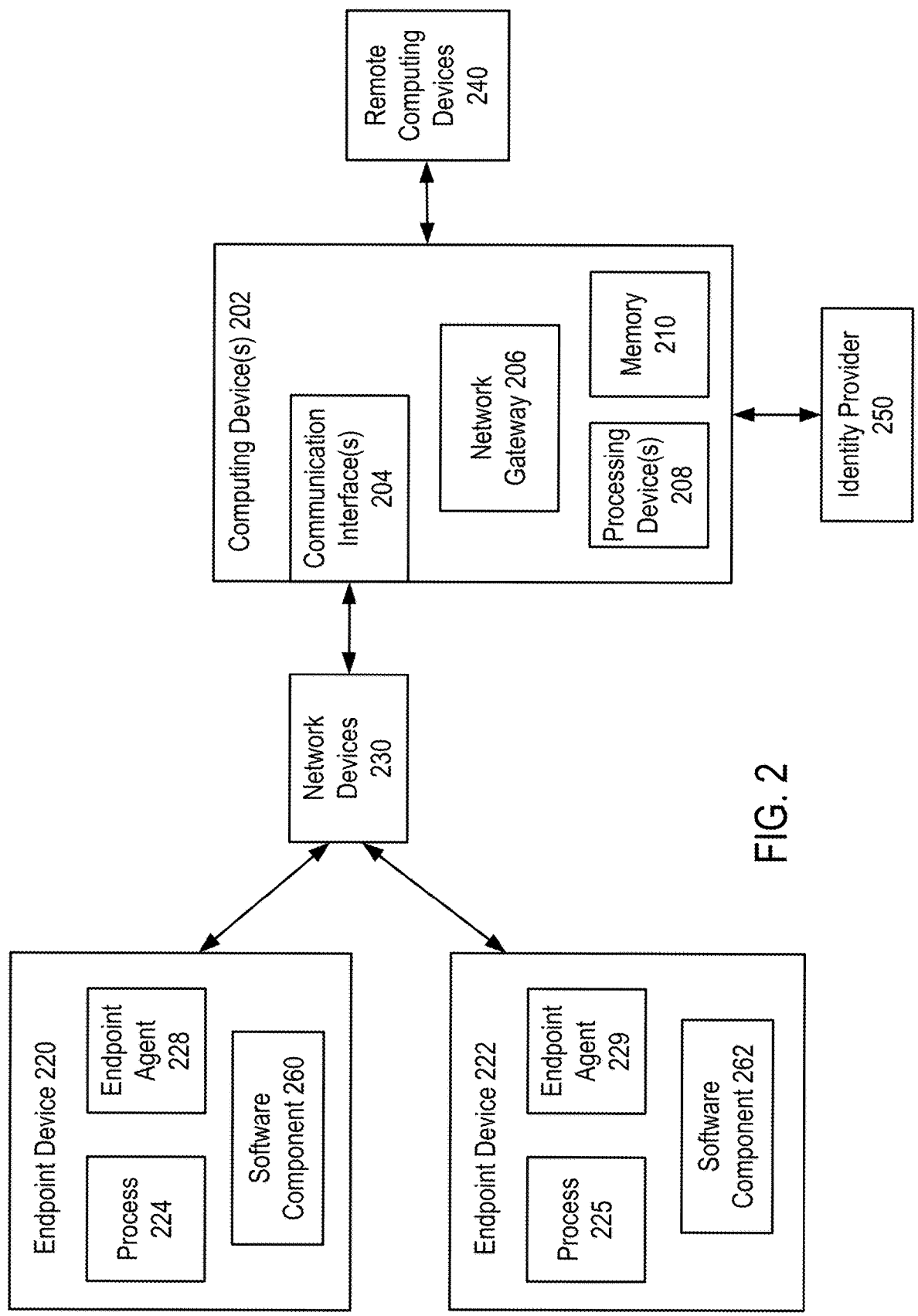
FIG. 2 shows a network gateway that evaluates security risks associated with processes running on endpoint devices, in accordance with some embodiments.

FIG. 2 shows a network gateway 206 that evaluates security risks associated with processes 224, 225 running on endpoint devices 220, 222, in accordance with some embodiments. Network gateway 206 is an example of network gateway 102. Endpoint devices 220, 222 are an example of endpoint devices 110, 112, 114.

Endpoint agents 228, 229 are installed on endpoint devices 220, 222 and collect data from the respective endpoint devices. The collected data is then gathered by network gateway 206 as metadata. The endpoint agents are, for example, software applications that have been downloaded by a user onto endpoint devices 220, 222 (e.g., downloaded from a mobile app store).

Software component 260 is installed on endpoint device 220. Software component 262 is installed on endpoint device 222. In one example, software components 260, 262 are applications or other programs downloaded from an application store or other source and installed by a user. Process 224 is one of several processes associated with running of software component 260. Process 225 is one of several processes associated with running of software component 262.

In one example, processes 224, 225 relate to communications with one or more remote computing devices 240. In one example, remote computing devices 240 include server 150, public cloud 152, private cloud 154, and/or data center 156.

Endpoint agents 228, 229 collect metadata that indicates characteristics associated with the communications of processes 224, 225. Endpoint agents 228, 229 communicate with network gateway 206 through one or more network devices 230. In one example, network devices 230 are configured as part of internal networks 120. In one example, network devices 230 include routers, switches, firewall devices, and/or security appliances.

In one embodiment, a software component is installed on each of network devices 230, and each software component communicates with network gateway 206 to provide metadata related to network communication occurring on the respective network device. The metadata from the network devices 230 is used by network gateway 206 in combination with metadata from endpoint agents 228, 229 to identify security risks.

In one embodiment, network gateway 206 gathers data associated with characteristics of network communications occurring through the network gateway 206 with remote creating devices 240. The data associated with these characteristics is used in combination with metadata from endpoint agents 228, 229 and/or metadata from network devices 230 to evaluate security risks.

In one example, network gateway 206 can determine a security risk (e.g., for an endpoint device and/or network device) and take responsive actions similarly as described in U.S. Patent Application Publication U.S. 2020/0304503, published Sep. 24, 2020, by Zerrad et al., and titled "COMMUNICATING WITH CLIENT DEVICE TO DETERMINE SECURITY RISK IN ALLOWING ACCESS TO DATA OF A SERVICE PROVIDER", which is hereby incorporated by reference in its entirety.

Network gateway 206 runs on one or more computing devices 202. One or more communication interfaces 204 of computing devices 202 are connected to network devices 230 for receiving communications from, and sending communications to, endpoint agents 228, 229. In one example, communication interface 204 is a network interface card. In one example, network device 230 is a router connected to multiple Ethernet networks.

Computing device(s) 202 includes one or more processing devices 208 and memory 210. In one example, network gateway 206 runs on processing device 208. In one example, a hypervisor runs on processing device 208. The hypervisor manages virtual machines used to implement network gateway 206.

Memory 210 is volatile and/or nonvolatile memory used by network gateway 206 during execution, including evaluation of metadata for identifying security risks. In one example, a machine learning model is stored in memory 210. Metadata gathered by network proxy 206 is an input to the machine learning model. In one example, the machine learning model is an artificial neural network. An output from the machine learning model is used by gateway 206 as part of identifying security risks.

In one embodiment, network gateway 206 communicates with a computing device of identity provider 250. In one example, identity provider 250 authenticates a user of endpoint device 220 (or authenticates the device hardware itself) when software component 260 is being used to access a service on a remote computing device 240.

In other embodiments, endpoint agents can be implemented in various ways using software and/or hardware. Agents installed on network devices to collect the above metadata for sending to network gateway 206 can be implemented similarly.

In one example, an agent (e.g., endpoint agent, network agent) is a programmer component that runs in user world, in the post operating system or in kernel load, in the host operating system, or in a special secure mode (e.g., such as the ARM processor provides for a secure world), or in a hypervisor that is running underneath the operating system, or in a container architecture such as Kubernetes (e.g., where it runs as part of the infrastructure as opposed to part of the operating system). The network agent can also run in BIOS or firmware.

In one example, the agent is a dedicated chip or processing hardware unit that resides in a board of a secure processor, graphics processor, a communication processor, or any other processor. For example, there are benefits to having that capability outside the operating system, because many cyber attackers simply disable operating system controls.

In one example, Intel architecture processors (e.g. SGX), ARM architecture processors, and Apple's M series processors have two kinds of security architectures: a real world and a secure world. The real world is where the operating system runs, and anything running there, including the real world operating system, cannot access storage or memory that is under control of the secure world. There is a queue of information that can go back and forth between the real and secure worlds for signaling.

In one example, there is dedicated memory and dedicated storage used in a Trusted Execution Environment (TEE). The agent can reside in the secure world of this architecture and/or between the communication channel of the real world and the secure world.

In one embodiment, network gateway 206 includes two SSE remediation engines working in tandem: a network remediation engine acts on the network side, and an endpoint remediation engine acts on the endpoint side. In response to detecting an exfiltration attempt or other unauthorized activity, the endpoint remediation engine sends data to the network remediation engine. The network remediation engine collects sensory information regarding the device (e.g., endpoint device or network device) and/or user that is sending data, which process is performing the sending, etc.

In response to the network remediation engine determining an exfiltration attempt, the network remediation engine blocks this exfiltration attempt at all the affected endpoints (e.g., to shut down the major exfiltration door). In one example, if exfiltration activity is seen at least once from one set of endpoints (or application(s)), or specific processes indicate abnormal network data flow, a firewall rule is automatically enacted for the entire same-subnet of other devices to block exfiltration attempts from other same-subnet devices. For example, if a cyber attacker is trying to exfiltrate data from one endpoint, it is possible the attacker has moved the attack to other endpoints or apps on the same subnet and will try to exfiltrate from those as well.

In one embodiment, the above blocking is combined with individual host-specific endpoint remediation engine changes to block that specific endpoint device's outbound communication. For example, a combination of network traffic observed characteristics data triggers an integration with SSE security (e.g., as implemented by network gateway 206) to push a network firewall change to the network (e.g., reconfigure firewall and/or other settings for one or more of network devices 230).

In one embodiment, once it is confirmed with a threshold level of certainty that an exfiltration event is occurring, the endpoint remediation engine proactively takes action to block other commonly-attacked ports between endpoint and/or network devices on the same subnet and other subnets (e.g., same or related RPC port range, SMB). These changes can be implemented via the endpoint device while other changes referenced above can be triggered via SSE security actions directly (e.g., as implemented by network gateway 206).

In one embodiment, simultaneously with actions by the network remediation engine above, the endpoint remediation engine takes the action of locking down one or more endpoint devices. By blocking all network connections associated with an identified security risk, file access and other unauthorized activities are locked down in place. A sliding scale of responsive actions can be configured by a network administrator as desired—from the most restrictive/aggressive action to the least aggressive action (e.g., better enables productivity).

In one example, a responsive action is to completely block all outbound internet activity. In one example, a responsive action is to kill the individual process (or uninstall the application). In one example, a responsive action is to allow legitimate components or parts of malicious applications continue to run while only blocking access by the malicious applications to undesirable (e.g., bad) domains.

In one embodiment, as soon as ransomware or some unusual activity is detected, the endpoint device is quarantined using the endpoint remediation engine.

In one embodiment, quarantining is implemented by no longer allowing the client endpoint device to interact with any ZTNA sessions within the client itself (apps, servers). When network gateway 206 detects such bad behavior, it immediately shuts off the ability for the client to interact with ZTNA sessions.

In one embodiment, in addition to the above quarantining, network gateway 206 can send a signal to an SSE security process that interrogates a single sign-on (SSO) platform (e.g., identity provider 250, or Okta) for the specific user of the client and determine which applications are active for that user. In one example, network gateway 206 uses SCIM integrations to effectively disable a specific level of permissions for those users across these different apps, making it more difficult for a cyber attacker to steal data from these other apps.

In one example, System for Cross-Domain Identity Management (SCIM) is an open standard protocol for automating the exchange of user identity information between identity domains and IT systems. SCIM provisioning helps in establishing communication between cloud-based applications, by formalizing the integration between identity providers and service providers (e.g., SaaS apps a user needs to access).

In one embodiment, network gateway 206 explicitly revokes access to the apps through SSO directly. For example, gateway 206 sends an identification of a user of an endpoint device to identity provider 250. In response to receiving the identification, identity provider 250 revokes authorization by the user. For example, this revocation is applied to any existing process that previously was authorized by a query to identity provider 250 (e.g., a query from a user mobile device).

In one embodiment, in response to identifying a security risk, network gateway 206 takes actions that include leveraging Security Orchestration Automation & Response (SOAR) type activity combined with remediation action taken at one or more endpoint devices. In one embodiment, these actions can further include actions taken at the firmware or hardware level of an endpoint or network device.

Figure 3:
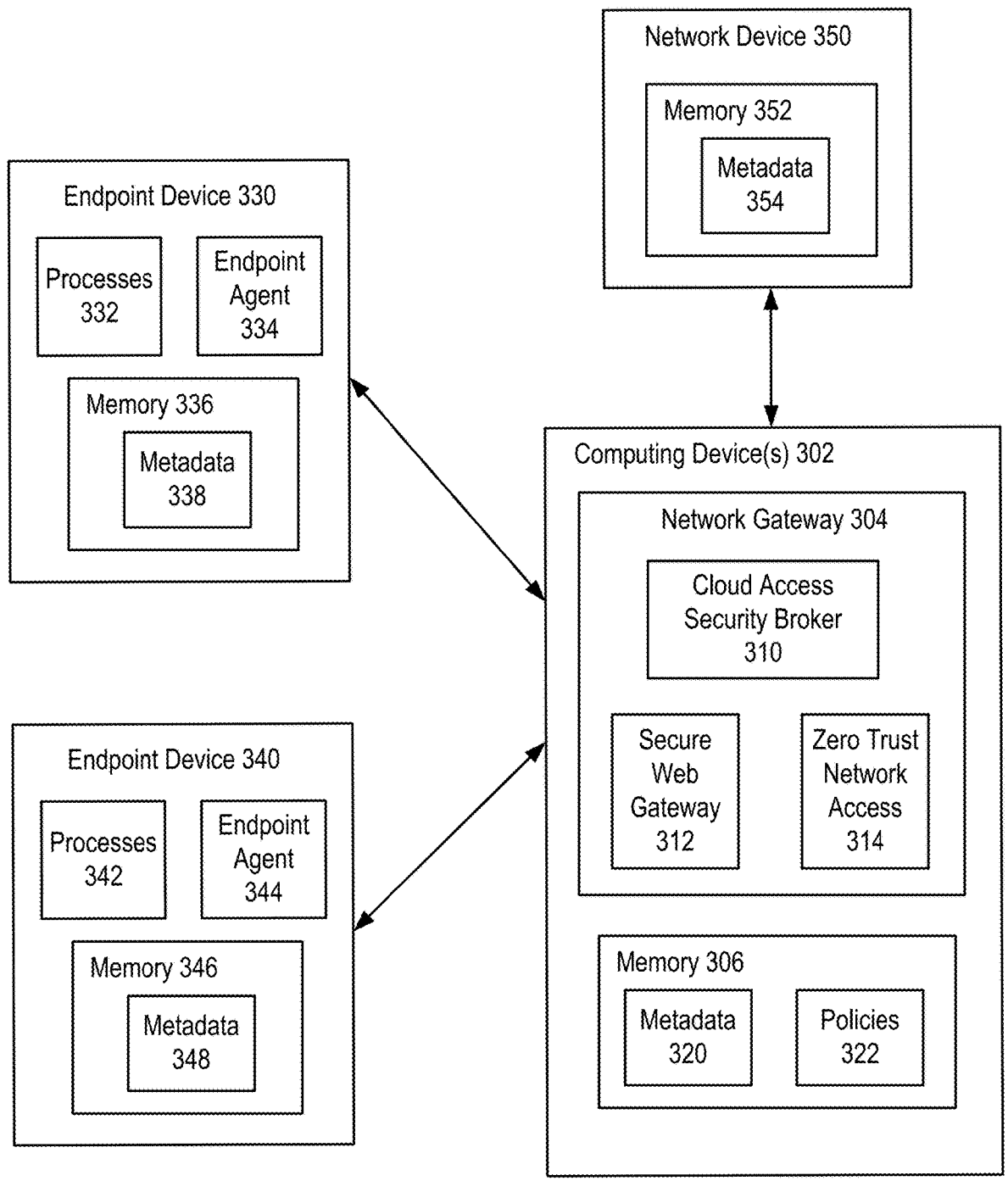
FIG. 3 shows a network gateway that gathers metadata from endpoint agents and/or network devices, which is used to identify security risks, in accordance with some embodiments.

FIG. 3 shows a network gateway 304 that gathers metadata from endpoint agents 334, 344 and/or network devices (e.g., 350) that is used to identify security risks, in accordance with some embodiments. Endpoint devices 330, 340 communicate with one or more computing devices 302 over a network (e.g., 120). Endpoint devices 330, 340 are an example of endpoint devices 110, 112, 114. Network device 350 is an example of network device 230. Network gateway 304 is an example of network gateway 102, 206.

Endpoint device 330 collects metadata 338 and stores it in memory 336. Metadata 338 relates to characteristics of processes 332 running on endpoint device 330. Endpoint agent 334 communicates metadata 338 to network gateway 304 (e.g., similarly as described above).

Endpoint device 340 collects metadata 348 stores it in memory 346. Metadata 348 relates to characteristics of processes 342 running on endpoint device 340. Endpoint agent 344 communicates metadata 348 to network gateway 304.

In one embodiment, each endpoint agent communicates metadata to gateway 304 on a periodic basis. In one embodiment, each endpoint agent communicates metadata when requested by gateway 304. In one example, gateway 304 makes a request for metadata after identifying a security risk. In one example, the request is for metadata specifically related to a process identified as related to the security risk.

In one embodiment, gateway 304 identifies one of processes 332 as a security risk. Gateway 304 determines that one of processes 342 is the same or similar to the one of processes 332 identified as a security risk. In response to determining that one of processes 342 is also a security risk, gateway 304 sends a request to endpoint agent 344 that requests metadata 348 specifically for the process 342 associated with this identified security risk.

In one embodiment, a software agent on network device 350 collects metadata 354 and stores it in memory 352. The agent sends metadata 354 to network gateway 304, either periodically and/or on request (e.g., for a requested particular process) as described above.

Network gateway 304 runs on one or more computing devices 302. In one embodiment, gateway 304 runs on one or more virtual machines in a cloud computing environment.

In one embodiment, metadata 320 is stored in memory 306 of computing device 302. Metadata 320 includes metadata collected from endpoint agents 334, 344 and/or network device 350.

In one embodiment, policies 322 are stored in memory 306. Policies 322 include, for example, mobile device management policies for endpoint devices 330, 340. In one embodiment, responsive actions taken by gateway 304 are configured based on the one or more of policies 322 that apply to an endpoint device and/or network device that is to be remediated in some manner.

In one embodiment, network gateway 304 implements one or more of cloud access security broker 310, secure web gateway 312, or zero trust network access 314. For example, one or more of the foregoing is implemented for network communication by endpoint devices 330, 340 with remote computing devices (e.g., 240).

In one example, a large quantity of data is downloaded at a particular endpoint device. Network gateway 304 detects this download (e.g., a quantity threshold is exceeded) based on metadata sent from an endpoint agent on the endpoint device. Gateway 304 determines that this is sensitive data, and/or this data is not authorized to be downloaded in bulk. In response, gateway 304 starts incorporating rescue controls. For example, the location of the endpoint device is turned off using a CASB API. For example, an alert is sent by electronic communication (e.g., email or text message) to a network administrator indicating that there is a data exfiltration attempt at this endpoint device. For example, gateway 304 causes automatic quarantining of the endpoint device.

In one example, gateway 304 maintains a record all activity logs associated with identified security risks. In one example, this record is stored in memory 306. In one example, the record includes data regarding activity on the endpoint device for all processes running on the endpoint device. In one example, gateway 304 prepares a forensic analysis report based on the foregoing data. The record and report are prepared in real-time.

In one example, a malware file is downloaded by an endpoint device. The network gateway detects the malware file after it has been downloaded. In one example, the malware files detected using signature analysis, sandboxing, etc. Once the gateway determines that the downloaded file is malware, the gateway is able to determine in real-time the identity of devices that have the same or similar malware (e.g., using metadata 320). The gateway takes one or more actions to prevent any further damage by the malware (e.g., one or more responsive actions as described above).

In one example, a cyber attacker writes a Powershell script that goes undetected by antivirus software on an endpoint device. However, the network gateway uses user and entity behavior analytics (UEBA) capabilities to detect the script and take remediation action in real-time in response to this detection. For example, the gateway detects that abnormal activity is occurring in the network (e.g., based on an output from an artificial neural network using metadata 320 as input). In one example, UEBA uses machine learning to detect anomalies in the behavior of users in a network and/or routers, servers, and endpoints in that network. In one example, metadata 320 is an input to the machine learning.

In one embodiment, the network gateway looks for files that have been touched by the malware (e.g., modified or corrupted). The gateway takes a distributed action to stop this malware from spreading to other devices. In one example, the endpoint agents on the devices form a neural network that allows them to immediately share data peer-to-peer in some way. This can be faster than peer to cloud to peer data sharing. This can be done, for example, through a local cache of behavioral data sharing. In this manner the malware threat is locked down immediately and remediation actions started immediately.

In one embodiment, various endpoint device detection agents or engines may directly (e.g., peer-to-peer) communicate with each other to provide notifications of remediation actions that should be taken. This peer-to-peer communication can operate faster than having the agents communicate to a central hub, which then redistributes the notifications to the other agents.

In one example of an attack, a cyber attacker gets its device authorized for access to a corporate intranet (e.g., using a Multifactor Authentication (MFA) fatigue attack). After that, the attacker begins scanning the corporate network until it finds a PowerShell script with admin credentials for the corporate platform. The Powershell script allows the attacker to grab source code and access to a program which gives the attacker a vulnerability report.

In one example, network gateway 304 can prevent the above attack by using a UEBA engine and/or a DLP policy engine. As soon as the network gateway (having UEBA and/or DLP capabilities) observes that a particular user is having an unusual access to a program and/or accessing large quantities of vulnerability reports, the network gateway sends signals in real-time to quarantine that user's particular endpoint device.

Figure 4A:
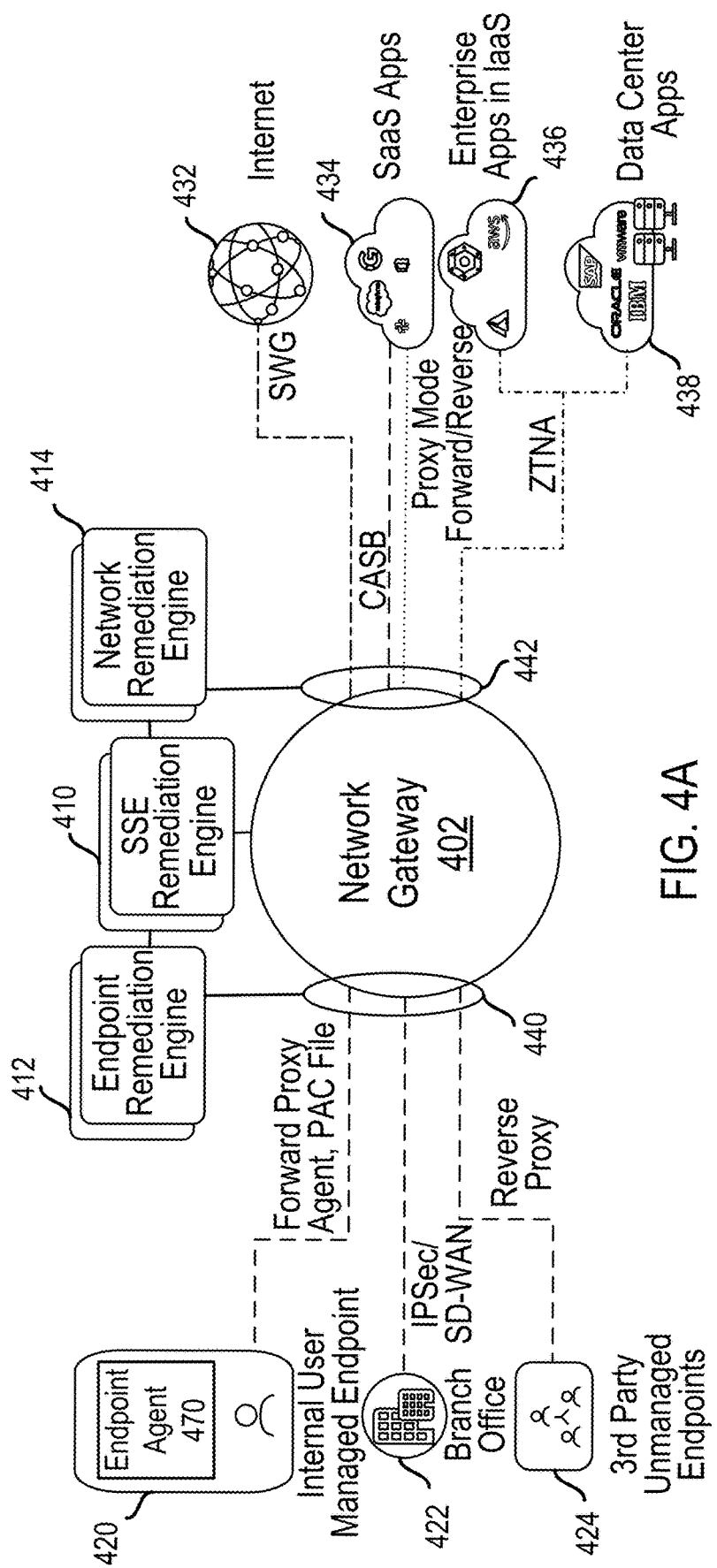
FIG. 4A shows a network gateway configured as an SSE remediation engine, in accordance with some embodiments.

FIG. 4A shows a network gateway 402 configured as an SSE remediation engine 410, in accordance with some embodiments. In one embodiment, SSE remediation engine 410 includes an endpoint remediation engine 412 (e.g., such as described above) and a network remediation engine 414 (e.g., such as described above). Network gateway 402 is an example of network gateway 102, 206, 304.

Various endpoint devices communicate through network gateway 402 with various remote computing devices. Endpoint devices include, for example, managed endpoints 420, user devices in branch office 422, and unmanaged endpoints 424. Remote computing devices include, for example, Internet servers 432, software as a service cloud 434, infrastructure as a service cloud 436, and data center servers 438.

In one embodiment, each endpoint device has an endpoint agent. For example, endpoint agent 470 is shown installed on endpoint 420. Endpoint agent 470 is an example of endpoint agent 228, 334.

Each endpoint agent is capable of blocking connections on its respective endpoint device. In one example, each endpoint agent is able to detect process maps. Data from these process maps can be sent to network gateway 402 as metadata. Each endpoint agent is able to enforce security at the process level, such as blocking an entire process.

In one embodiment, network gateway 402 continually communicates (e.g., periodically every 60-120 seconds or less) with the endpoint agents (e.g., 470). Network gateway 402 can act as a forward and/or reverse proxy for the endpoint devices.

In one embodiment, endpoint remediation engine 412 takes security actions that affect communications on connections 440 by endpoint devices. For example, endpoint remediation engine 412 sends signals to endpoint agents to block communication on a connection 440.

In one embodiment, network remediation engine 414 takes security actions that affect communications on connections 442 with remote computing devices. For example, network remediation engine 414 sends signals (e.g., using a server API) to network agents to block communication on a connection 442. In one example, the network agents reside on servers that provide SaaS applications. For example, the signals to the network agent terminate action with respect to a file or other stored data.

In one embodiment, each endpoint can itself initiate communication with the gateway 402 regarding metadata or a security risk identified by the endpoint. In one embodiment, the gateway 402 initiates communication with the endpoint.

The gateway 402 generally inspects and evaluates traffic through the gateway 402. Based on evaluating the traffic, the gateway 402 can take actions itself, through the endpoint agents, and/or through an API of a remote server (e.g., an API of SaaS application 434). Instead of, or in addition to, communicating with the endpoint agent, the gateway 402 in some cases can use an API of the SaaS app to have the SaaS app take some remediative action (e.g., shut down access to specified data).

In various embodiments, either an endpoint device or network gateway 402 independently, or both working together, identify the security risk. For example, the security risk is detected on the endpoint device and this is flagged to the network gateway for immediate real-time remediation. Network gateway 402 can identify security risks based on one or more of metadata gathered from any endpoint device(s), signals from endpoint agents indicating an identified risk, metadata from network devices, data stored at network gateway 402, and/or replies to requests made by network gateway 402 to external server(s).

In one embodiment, each endpoint continuously streams metadata to network gateway 402. Network gateway 402 continuously uses and enriches this streamed metadata. For example, network gateway 402 does a comparison of streamed data to data stored by network gateway 402. Then, based on this comparison, network gateway 402 performs a security action (e.g., enforces a policy) collectively on the gateway and then on the affected endpoints.

In one embodiment, managed endpoints 420 communicate with remote servers (and/or other remote computing devices) using a proxy auto-config (PAC) file. In one example, the PAC file defines how web browsers and other user agents on endpoints 420 automatically choose an proxy server for fetching a URL. In one example, the PAC file includes a JavaScript function for implementing the foregoing.

In one embodiment, managed endpoints 420 communicate with remote computing devices using a forward proxy. In one example, the forward proxy is a server application that acts as an intermediary between a client requesting a resource and the server providing that resource. When the endpoint makes a request for a resource, such as a file or web page, the endpoint directs the request to the proxy server. The proxy server evaluates the request and performs required network transactions.

In one embodiment, the forward proxy resides on the endpoint device itself. In one example, the forward proxy is an Internet-facing proxy used to retrieve data from remote computing devices on the Internet.

In one embodiment, communications to unmanaged endpoints 424 (e.g., from remote computing devices) pass through a reverse proxy. The reverse proxy is used to control and protect access to the endpoints 424 (and/or other computing devices on a private network behind network gateway 402). In one example, the reverse proxy performs load-balancing, authentication, decryption and/or caching.

In one embodiment, one or more of the user devices in branch office 422 communicate with one or more remote computing devices using a security protocol. For example, the security protocol can be Internet Protocol Security (IPsec). IPsec is a secure network protocol that authenticates and encrypts packets of data to provide secure encrypted communication between two computers over an Internet Protocol network. For example, IPsec is used in virtual private networks (VPNs).

In one embodiment, IPsec includes protocols for establishing authentication between communicating devices (e.g., by software agents on the devices) at the beginning of a session, and sharing of cryptographic keys to use during the session. In one example, IPsec protects data flows between endpoint devices and network gateway 402. In one example, IPsec implements network-level peer authentication, data origin authentication, data integrity, data confidentiality (encryption), and/or replay protection.

In one embodiment, various endpoint devices can communicate with network gateway 402 over one or more networks using software-defined wide area networks (SD-WAN). In one example, the SD-WAN supports applications and SaaS services such as Salesforce.com, Workday, Dropbox, Microsoft 365.

In one embodiment, the SD-WAN uses software-defined network technology and communicates over a network using overlay tunnels (e.g., for communications between internal enterprise nodes). For example, SD-WAN can decouple networking hardware from networking control. In one embodiment, communication with remote computing devices (e.g., Internet servers 432) uses an SWG. The SWG blocks certain types of communications with servers 432 (e.g., communications by endpoints 420). The SWG can include one or more firewalls and be, for example, implemented by network gateway 402. In one example, the SWG protects endpoint devices from accessing and being infected by malicious web traffic, websites with vulnerabilities, internet-borne viruses, malware, and/or other cyber threats. In one example, the SWG additionally and/or alternatively enforces compliance with one or more policies applicable to the endpoint devices (e.g., to prevent confidential information from being exposed externally).

In one embodiment, communications by remote computing devices (e.g., servers associated with IaaS cloud 436, and/or data center 438) with endpoint and/or other computing devices on a private network is implemented using ZTNA. In one example, the ZTNA enforces policies for providing access to endpoint devices. In one example, the policy is enforced based on context. The context can be a combination of user identity, user or service location, time of the day, type of service, and/or security posture of the endpoint device. In one example, the ZTNA is part of a Secure Service Edge (SSE) implemented at least in part by network gateway 402. In one example, the ZTNA is configured in real-time by network gateway 402 based on metadata gathered from endpoint and/or network devices.

The network gateway is able to enforce security controls granularly based on, for example, source IP address and destination IP address. Enforcement can also be done at a port level. The endpoint agents and network gateway communicate with each other and take actions based on learning from one another. The endpoint agent and the network gateway are also data gathering points.

In one embodiment, endpoint remediation engine 412 can take security control and/or remediation actions at any device on a private network behind gateway 402 that is implementing or using a forward or reverse proxy. Endpoint remediation engine 412 can configure IPsec and/or SD-WAN usage for any endpoint or network device (e.g., configure consistent with a policy to be applied when certain security risks are identified).

In one embodiment, metadata evaluation and security enforcement actions for multiple endpoint devices are performed in accordance with a single policy. The single policy is, for example, a standard policy chosen by an IT administrator of the endpoint devices, or an IT administrator of the proxy service, or by both of them.

In one example, each endpoint agent gathers metadata such as process information, process hierarchy, network elements, process to network handles (e.g., TCP sockets), and communications that are happening. Also, the endpoint agent can determine the actual user behind a process or session (e.g., is it a user level process or a system-level process), which can be communicated as metadata to network gateway 402.

In one example, network gateway 402 gathers metadata such as device source IP, user name, general endpoint device posture (e.g., whether the firewall is running), user risk, user group associations, destination IP, destination port, fully qualified domain names, and/or destination category.

In one embodiment, network gateway 402 generally knows about users, devices, applications, source and destination locations, and data being communicated on a network(s). Data regarding these items is tracked in real-time by gateway 402. This data is evaluated to identify security risks.

In one example, network gateway 402 communicates with an endpoint agent to signal that a malicious connection and/or a connection associated with a security risk was observed on a particular source port of the endpoint device. The endpoint agent then determines which process is associated with that source port, and the endpoint agent starts blocking that same and/or similar process(es) on one or more devices in a network.

In one embodiment, an inventory and visualization option is provided for processes running in a centralized cloud management platform. The visualization option permits, for example, an administrator to visualize running processes. In one embodiment, inventory and visualization option data is collected by network gateway 402.

In one example, at any given time, the administrator can see all processes that an organization allows on an endpoint device and the websites the devices are attempting to communicate with. Anytime an existing process begins communicating with a new website, the cloud management system is able to see it. This can also facilitate finding a new version of that product/process (e.g., when was it last updated to see if new websites added to the process might be normal for that update).

In one embodiment, for processes that are communicating with bad domains, this activity can be observed in the visualization presented to the administrator. That specific website can be dynamically blocked outbound from the endpoint device. Then, that website can be proactively blocked from other endpoints to mitigate lateral movement of rogue apps/processes spreading to other endpoints.

A bad domain in general is a domain that exhibits and/or is associated with a security risk (e.g., a risk identified by the network gateway through evaluation of metadata and/or queries to databases on servers and/or other computing devices). In one example, the bad domain is a malicious domain intentionally registered to engage in technical and/or content abuse. In one example, a domain is considered to be malicious if it contains unauthorized usage of a brand name, or a misleading string. In one example, the bad domain is a suspicious domain that is part of an advertising network used for malware delivery.

In one embodiment, network gateway 402 blocks bad or infected parts of a process, while allowing acceptable parts of the process to still function. For example, some organizations may desire that the entire process/application is killed, while other organizations may want to minimize impact on productivity. This approach permits mitigating supply chain related attacks while still allowing legitimate parts of an app/process to run.

In one embodiment, network gateway 402 can cause actions to trigger management software that performs actual uninstallations of types of software believed to be malicious in behavior. In one example, third party applications that have been implanted with malware (e.g., that are signed with legitimate certificates) can be addressed by the foregoing.

In one embodiment, there are processes that do not have outbound internet connectivity where use of a checksum or similar is advantageous. For processes with outbound internet connectivity, an SDK can be embedded into the related applications to ensure that connectivity goes through the network gateway. In one example, rather than be dependent on an OS config, a PAC file, an endpoint agent, or a SD-WAN connection, a proxy can be embedded into these apps that have outbound internet access.

Additionally, checksum or similar comparisons of software can be performed to determine if executables or processes have been modified. This can be used as a detection capability for identifying rogue processes.

In one embodiment, network gateway 402 implements a proxy-based CASB that places a proxy, agent or broker (e.g., some devices use browser extensions and are called "agentless") between the user and the cloud application (e.g., SaaS app 434). On a basic level, the proxy checks for known users and devices as they attempt to access the cloud resource and either approves or denies access. A benefit of a proxy CASB is that it provides a greater level of control over outgoing traffic and can take security action in real-time.

In one embodiment, network gateway 402 includes at least one computing device configured to provide at least one communication interface (e.g., for implementing TLS or other secure communication with endpoint devices). The communication interface is used to communicate over at least one network with a plurality of endpoint devices. Each endpoint device runs a respective endpoint agent configured to gather metadata associated with its respective endpoint device and send the gathered metadata to network gateway 402.

Network gateway 402 receives, from a first endpoint agent, first metadata corresponding to a first endpoint device; identifies, based at least on the first metadata, a security risk; and in response to identifying the security risk, performs at least one security action. In one embodiment, the security action limits or blocks at least one process associated with the identified security risk. In one embodiment, the process is limited or blocked on the first endpoint device and one or more other endpoint devices.

In one embodiment, network gateway 402 identifies the security risk based on the gathered metadata. In one embodiment, an endpoint device itself first identifies the security risk (e.g., identifies natively) and communicates an indication of the security risk to network gateway 402, which performs the at least one security action in response to receiving the indication.

In one embodiment, network gateway 402 gathers second metadata associated with the network, and the security risk is identified based on both the first and second metadata. In one embodiment, the security risk is identified by network gateway 402 based on any observed and/or known risk. For example, metadata gathered by network gateway 402 from one or more endpoint device(s) is enriched by other data gathered and/or stored at network gateway 402.

In one embodiment, at least one of the first metadata or the second metadata relates to data traffic on the network and includes at least one of: source IP address, destination IP address, source port, destination port; executable name for process that is communicating on an endpoint device(s); content or files that are being accessed by an endpoint device(s); data loss prevention (DLP) associated with an endpoint device(s) (e.g., sensitive tokens and/or artifacts identified by a DLP engine on an endpoint device and/or network gateway 402); destination fully-qualified domain name (FQDN) being used by an endpoint device(s); data regarding context of an endpoint device(s); data regarding a user of an endpoint device (e.g., user attributes such as user group); or data regarding a process and/or application being used by an endpoint device(s).

In one embodiment, performing a security action by network gateway 402 includes sending a respective signal to one or more endpoint devices. The endpoint agent of each endpoint device is configured to, in response to receiving the respective signal, determine a process running on the endpoint device that is associated with the security risk, and then block the process and/or take other remediation action. In one embodiment, once information is learned by network gateway 402, network gateway 402 continues to learn from metadata gathered from other endpoint devices. In one example, if a response and/or other data is matched to a security risk, immediate remediation action is taken (e.g., shut down a process on one or more endpoints).

In one embodiment, network gateway 402 gathers metadata from a first set of endpoint devices (e.g., prior to time T1). After gathering the metadata from the first set of endpoint devices, network gateway 402 gathers metadata from a second set of endpoint devices (e.g., at time T1). Network gateway 402 identifies (e.g., in real-time at time T1) a security risk based on the metadata gathered from the second set of endpoint devices. In response to identifying the security risk based on the metadata gathered from the second set of endpoint devices, network gateway 402 performs at least one security action for the first and second sets of endpoint devices.

In one example, the gateway receives metadata from many endpoint devices at time T0 before knowing or determining that any malware exists. The detection of the malware comes at a later stage (e.g., because evaluation of metadata takes some processing time to perform, etc.). The detection occurs at time T1, and then the gateway starts to block traffic and/or send signals to endpoint devices (e.g., to stop a process). The gateway also goes back in time to clean up and/or remediate earlier endpoint devices that sent metadata before time T1.

FIG. 4B shows an API mode cloud access security broker (CASB) 460 that uses data collected from one or more APIs 462 to identify security risks, in accordance with some embodiments. CASB 460 operates in API mode. Endpoint agents on various endpoint devices (e.g., 420) continually communicate with CASB 460 to identify security risks and then implement security actions.

In some embodiments, a system can be implemented using both a network gateway (e.g., 402) operating in proxy mode, and CASB 460 operating in API mode as remediation components that cooperate with one another to identify security risks and/or to take security actions. In such cases, endpoint agents are in continual communication with one or both of the network gateway and/or API mode CASB.

CASB 460 has a communication interface (not shown) that communicates over one or more networks with the endpoint devices. Each endpoint device runs a respective endpoint agent to communicate with CASB 460.

CASB 460 communicates with SaaS apps 434 using one or more APIs 462. The CASB gathers metadata from endpoint agents 470 and gathers metadata from SaaS apps 434 over the APIs 462. For example, the metadata can be pushed to CASB 460 (as events published by SaaS app 434) and/or can be requested by CASB 460 over API 462.

Endpoints 420, 422, 424 communicate directly with remote computing devices using cloud service access 450. In one example, cloud service access 450 is a network gateway (e.g., 402) and/or other network communication path. In one embodiment, a computing device providing cloud service access 450 includes a proxy and/or firewall.

In one embodiment, CASB 460 can take security actions that configure cloud service access 460. In one example, the security actions are the same or similar as described for the network gateway (e.g., 102, 402) above.

In one embodiment, CASB 460 uses SaaS app 434 connections (e.g., for security risk evaluation). For example, the CASB determines activity has occurred based on data received from a SaaS server over API(s) 462 (e.g., detects that a user has uploaded a file to Google drive). In response to the detection, the CASB 460 can inspect the file that was uploaded, modify it or delete it, or take other action.

Additionally and/or alternatively, instead of using an API, the CASB 460 can get information for an endpoint device(s) and/or other activity based on web hooks. In one example, a web hook is an event-driven push from the SaaS app.

In one embodiment, a system comprises: at least one computing device; and memory storing instructions configured when executed to cause the at least one computing device to: provide at least one communication interface, the communication interface configured to communicate over at least one network with a plurality of endpoint devices (e.g., 420, 422, 424), wherein each endpoint device runs a respective endpoint agent (e.g., 470), and wherein each endpoint agent is configured to gather metadata associated with its respective endpoint device and send the gathered metadata to an API mode cloud access security broker (CASB) (e.g., 460); and implement the CASB.

The CASB is configured to: receive, from a first endpoint agent, first metadata corresponding to a first endpoint device; identify, based at least on the first metadata, a security risk; and in response to identifying the security risk, perform at least one security action, wherein performing the security action comprises causing limiting or blocking of at least one process associated with the identified security risk, and wherein the process is limited or blocked on the first endpoint device and one or more other endpoint devices.

Figure 4C:
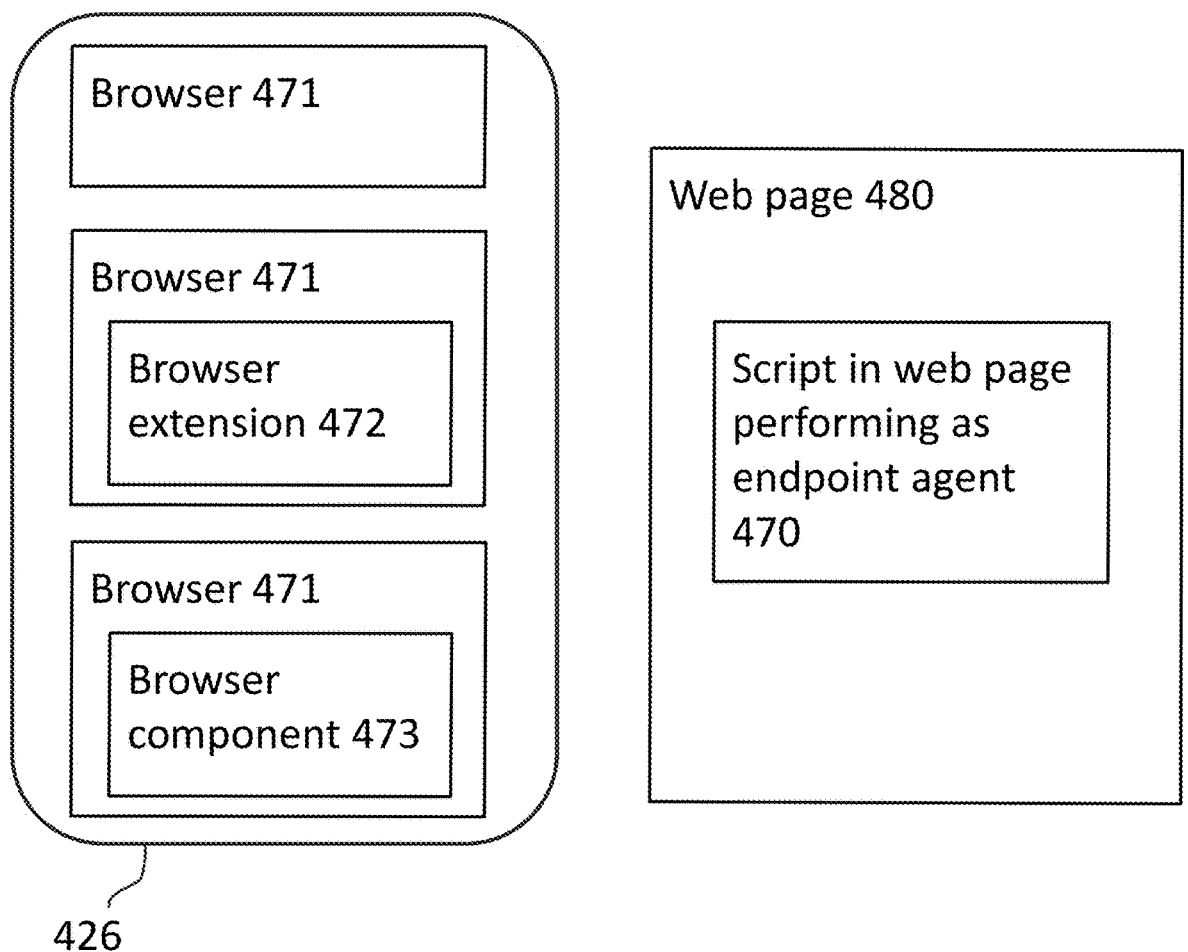
FIG. 4C shows various exemplary embodiments of endpoint agents.

FIG. 4C shows various exemplary embodiments of endpoint agents that can be installed on an endpoint device 426. Endpoint device 426 includes a browser 471 (shown in three exemplary browser implementations). In some examples, endpoint device 426 is an internal user-managed endpoint 420, or a third-party unmanaged endpoint 424.

As illustrated in FIG. 4C, in some embodiments an endpoint agent can be a browser extension 472 of browser 471, or a component 473 of browser 471.

In one embodiment, an endpoint agent is a just-in-time set of functionality delivered by a SaaS app (e.g., 434) within a web page 480, which performs some or all of the endpoint agent functionality. In one example, the endpoint agent functionality is provided by JavaScript served to browser 471 on the endpoint device 426 by SaaS app 434. Web page 480 is obtained by browser 471 from SaaS app 434.

In one embodiment, an endpoint agent is a component of one or more applications installed on an endpoint device 426. In one example, a word processing application is installed with a security agent in the application that implements endpoint agent functionality.

In one embodiment, an endpoint agent is a component of an underlying operating system of endpoint device 426, or a component of device firmware of endpoint device 426.

In one embodiment, an endpoint device opens a webpage. The functionality of an endpoint agent is delivered (e.g. using JavaScript or other script) in real-time as part of an application transaction with the endpoint device. The endpoint agent functionality is embedded within the client-side of the SaaS application.

In one embodiment, an endpoint device does not have an endpoint agent itself on the endpoint device (e.g., no endpoint agent functionality is instrumented on the endpoint itself). Instead, a SaaS app has server-side instrumentation on every connection with an endpoint. The SaaS app instrumentation includes the endpoint agent functionality, and as such, enforcement is moved to the SaaS app. In one example, the functionality of endpoint agent 470 is included in SaaS app 434. In one example, SaaS app 434 itself can implement policy control for an enterprise.

Figure 5:
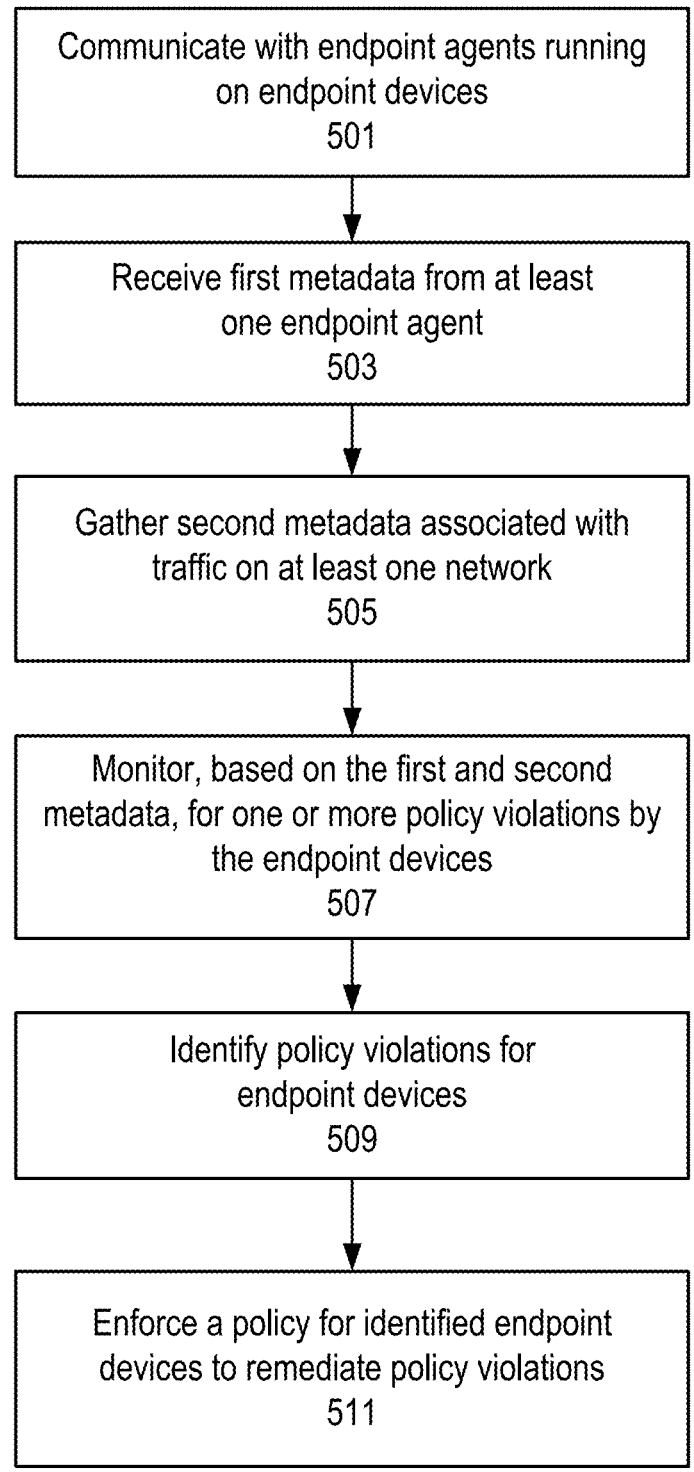
FIG. 5 shows a method for identifying policy violations for endpoint devices that communicate on a network(s), in accordance with some embodiments.

FIG. 5 shows a method for identifying policy violations for endpoint devices that communicate on a network(s), in accordance with some embodiments. For example, the method of FIG. 5 can be implemented in the systems of FIGS. 1-4.

The method of FIG. 5 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 5 is performed at least in part by one or more processing devices (e.g., 208).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 501, communication is performed with endpoint agents running on endpoint devices. In one example, network gateway 206 communicates with endpoint agents 228, 229.

At block 503, first metadata is received from at least one endpoint agent. In one example, metadata 338 is received by network gateway 304 from endpoint device 330.

At block 505, second metadata associated with traffic on at least one network is gathered. In one example, metadata 354 is received by network gateway 304 from network device 350.

At block 507, based on the first and second metadata, monitoring for one or more policy violations by the endpoint devices is performed. In one example, network gateway 304 monitors network activity to determine if an endpoint device violates an applicable one or more of policies 322.

At block 509, policy violations for endpoint devices are identified. In one example, network gateway 102 identifies a policy violation by endpoint device 114.

At block 511, a policy for identified endpoint devices is enforced to remediate policy violations. In one example, network gateway 304 performs actions to limit or block processes running on endpoint devices so that the endpoint devices become compliant with one of policies 322.

In one embodiment, an endpoint device has a network interface for talking with the network gateway. The network gateway has a listening interface for talking to multiple endpoint devices.

In one embodiment, identifying a security risk on a first endpoint device is an initial trigger. In response, the network gateway distributes enforcement back to the first and other endpoint devices (e.g., to castle or sandbox a process associated with the security risk).

In one embodiment, action is taken at the network gateway in real-time based on what is learned at the endpoint device. In one example, these actions include creating trapdoors and locking down at the process level (e.g., like the enforcement granularity and distributed enforcement above).

In one embodiment, the network gateway implements distributed data gathering and distributed policy enforcement in real-time to prevent network meltdowns or lateral movements caused by a cyber attack.

In one embodiment, a network gateway (e.g., 102, 206, 302, 402) provides network security as a service platform (e.g., an SSE platform running in a public cloud (e.g., AWS)) (e.g., a platform that delivers micro services). In one example, the platform delivers a proxy gateway as a micro service(s). In one example, the network gateway runs on one or more virtual machines hosted by a public cloud.

In one embodiment, the network gateway acts as a proxy for all endpoints going to the Internet, SaaS applications (e.g., Office 365, Slack), enterprise applications (e.g., organizations running applications within their network or private cloud), and/or data centers (e.g., using ZTNA). The network gateway provides network intelligence, and endpoint agents provide endpoint intelligence. The network and endpoint intelligence are coordinated in real-time to identify security risks. For example, customer endpoints and other devices have software components installed that communicate with the network gateway. Examples of remediation actions include implementing a change on the network layer, or quarantining.

In one embodiment, the endpoint device can have a localized remediation engine (e.g., a software component installed on a mobile device) that communicates with the network gateway. The network gateway also can interact with other network devices (e.g., a firewall or a router) to limit and/or stop bad traffic or other communication. In one example, a network device is reconfigured to block movement by a cyber attack threat from one endpoint device to another endpoint device within the same network. In one example, the network gateway takes actions to reconfigure a computing device at an enterprise firewall level.

In one embodiment, the endpoint agent maintains a process map that includes source and destination address/port information for each process. The network gateway can signal the endpoint agent to take actions based on the process map. The endpoint agent can limit or block a process in response to the signal and by using data stored in the process map. In one example, a connection associated with an identified process is closed by a software component on the endpoint device. In addition, the network gateway can block that same connection (e.g., this same connection can be closed based on data received from the endpoint agent). In addition, the network gateway and the endpoint agent can communicate with one another regarding an identity of the source of a bad connection.

In one embodiment, the network gateway implements gating for a network. In response to determining a security risk at an endpoint device the network gateway determines other endpoint devices and/or network devices that are exposed to the same security risk. Then, the network gateway blocks communication and/or takes other actions associated with the security risk.

In one embodiment, a system comprises: at least one computing device (e.g., server) (e.g., 202) configured to provide at least one communication interface (e.g., 204) (e.g., a listening interface), the communication interface configured to communicate over at least one network (e.g., 120) with a plurality of endpoint devices (e.g., 220, 222), wherein each endpoint device runs a respective endpoint agent (e.g., 228, 229), and wherein each endpoint agent is configured to gather metadata (e.g., 338, 348) associated with its respective endpoint device and send the gathered metadata to a network gateway (e.g., 102, 206, 304, 402); and at least one computing device (e.g., 202, 302) (e.g., a server running on a virtual machine) implementing the network gateway, the network gateway configured to: receive, from a first endpoint agent, first metadata corresponding to a first endpoint device; identify, based at least on the first metadata, a security risk; and in response to identifying the security risk, perform at least one security action by the network gateway, wherein performing the security action comprises causing limiting or blocking of at least one process associated with the identified security risk (e.g., blocking communication on a connection used by a process associated with the identified security risk), and wherein the process is limited or blocked on the first endpoint device and one or more other endpoint devices (e.g., block lateral movement of the security risk to other endpoint devices).

In one embodiment, the network gateway is further configured to receive, from a second endpoint agent, second metadata corresponding to a second endpoint device, wherein the security risk is identified further based on the second metadata.

In one embodiment, the network gateway is further configured to gather second metadata associated with the network, and the security risk is identified further based on the second metadata.

In one embodiment, the second metadata relates to data traffic on the network and includes at least one of: source IP address, destination IP address, source port, destination port; executable name for process that is communicating on endpoint device; content or files that are being accessed by endpoint device; data loss prevention (DLP) associated with endpoint device; destination fully-qualified domain name (FQDN) being used by endpoint device; data regarding context of endpoint device; data regarding user of endpoint device; or data regarding process or application being used by endpoint device.

In one embodiment, the at least one network comprises a plurality of network devices (e.g., 350), and gathering the second metadata includes receiving the second metadata from one or more of the network devices.

In one embodiment, the network devices comprise at least one of a router, a firewall, a network switch, a forward proxy, or a reverse proxy; and the endpoint devices comprise at least one of desktops, laptops, smartphones, tablets, servers, workstations, or Internet-of-things (IoT) devices.

In one embodiment, the endpoint devices connect through the network gateway to remote computing devices (e.g., 240) (e.g., servers that are accessed over the Internet, and provide access to software and/or databases that run on those servers) (e.g., computing devices in at least one data center that implement one or more public and/or private clouds).

In one embodiment, the network gateway is further configured to gather second metadata associated with one or more of the remote computing devices (e.g., collect data over an API from a computing device that is providing software as a service (SaaS) to the first endpoint device); and the security risk is identified further based on the second metadata.

In one embodiment, the security action is performed for a second endpoint device on the same network (e.g., same subnet) as the first endpoint device.

In one embodiment, performing the security action comprises sending a signal (e.g., an electronic communication) to the first endpoint device, wherein the first endpoint agent is configured to, in response to receiving the signal: determine a first process running on the first endpoint device that is associated with the security risk; and block the first process.

In one embodiment, the first endpoint agent is further configured to send first process data characterizing the first process (e.g., identification of malware) to the network gateway; and the network gateway is further configured to, in response to receiving the first process data, send a signal to a second endpoint device running a second endpoint agent, the signal causing the second endpoint agent to block one or more processes on the second endpoint device that correspond to the first process data (e.g., block running of any software process corresponding to the identification of the malware).

In one embodiment, performing the security action comprises: determining a first software component (e.g., 260) installed or downloaded by the first endpoint device; determining a second endpoint device that has installed or downloaded a second software component (e.g., 262) that is similar to the first software component within a comparison threshold (e.g., the same or similar malware) (e.g., determining that the second software component is similar to the first software component based on comparing structural and/or behavioral characteristics); and sending a signal to the second endpoint device that causes a second endpoint agent running on the second endpoint device to block execution of the second software component.

In one embodiment, the network gateway is further configured to perform an evaluation of network traffic flowing through the network gateway, and the security risk is identified further based on the evaluation of the network traffic.

In one embodiment, the first metadata includes data regarding a first process (e.g., 224) executing on the first endpoint device; the first process is limited or blocked on the first endpoint device according to a first policy that applies to the first endpoint device; and the first process (e.g., process 225 is determined to be the same process as process 224) is limited or blocked on a second endpoint device according to a second policy that applies to the second endpoint device (e.g., remediation is granular as to a specific process and/or policy that applies to a particular endpoint device; other processes running on the endpoint device are not limited).

In one embodiment, the network gateway is further configured to: access a plurality of policies (e.g., 322) associated with the endpoint devices; and in response to identifying the security risk, determine policies associated with the first endpoint device and the other endpoint devices; wherein the security action is performed for the first endpoint device and the other endpoint devices in accordance with the policies (e.g., distributed policy enforcement based on the identified security risk).

In one embodiment, the network gateway (e.g., an SSE remediation engine 410) is further configured to implement at least one of a cloud access security broker (CASB), zero trust network access (ZTNA), or a secure web gateway (SWG); and the security action is performed in real-time (e.g., within 1-5 seconds or less) after identifying the security risk.

In one embodiment, a non-transitory computer-readable medium stores instructions which, when executed on at least one computing device configured to implement a network gateway, cause the at least one computing device to: communicate with a plurality of endpoint agents running on endpoint devices, wherein the endpoint agents communicate with the network gateway using at least one internal network (e.g., internal communications using SD-WANs, VXLANs, and/or IPsec tunnels), and wherein each endpoint agent is configured to gather metadata associated with a respective endpoint device and send the gathered metadata to the network gateway; receive, from at least one of the endpoint agents, first metadata; gather second metadata associated with network traffic flowing through the network gateway, wherein the network traffic is associated with communications between the endpoint devices and at least one external computing device (e.g., remote computing devices 240) (e.g., servers providing SaaS, IaaS, and/or access to public or private clouds) (e.g., a server acting as an Internet host); identify users (e.g., actual persons) associated with processes running on the endpoint devices (e.g., determine whether each process is a user-level or system-level process); identify, based at least on the first and second metadata, a first security risk for a first process (e.g., 332) associated with a first user of a first endpoint device; and in response to identifying the first security risk, limit or block the first process on the first endpoint device (e.g., limit or block according to a stored mobile device management (MDM) policy for the first user), and limit or block a second process (e.g., 342) on a second endpoint device (e.g., limit or block according to a stored mobile device management (MDM) policy for a second user), wherein the second process is similar to the first process within a comparison threshold (e.g., first and second processes are identical in the simplest case). In one example, similarity is based on behavior and/or structure of software that executes the process.

In one embodiment, the second metadata includes at least one of user name, user risk, or user group associations.

In one embodiment, the instructions further cause the at least one computing device to: interrogate a computing device of an identity provider (e.g., 250) (e.g., an SSO platform hosted by Okta) for the first user; based on the interrogation, determine at least one application that is active for the first user; and cause disabling of permission for access by the first user to the application on the first endpoint device (e.g., cause disabling of permissions using SCIM integrations).

In one embodiment, a network gateway communicates with endpoint devices using at least one network. A method performed by the network gateway comprises: communicating with a plurality of endpoint agents running on the endpoint devices, wherein each endpoint agent is configured to gather metadata associated with a respective endpoint device and send the gathered metadata to the network gateway; receiving, from at least one endpoint agent, first metadata; gathering second metadata associated with traffic on the at least one network; monitoring, based at least on the first and second metadata, for one or more policy violations by the endpoint devices, wherein the first and second metadata are gathered in real-time while performing the monitoring; identifying policy violations for a plurality of first endpoint devices; and in response to identifying the policy violations, enforcing a respective policy for each of the first endpoint devices to remediate the policy violations.

Figure 6:
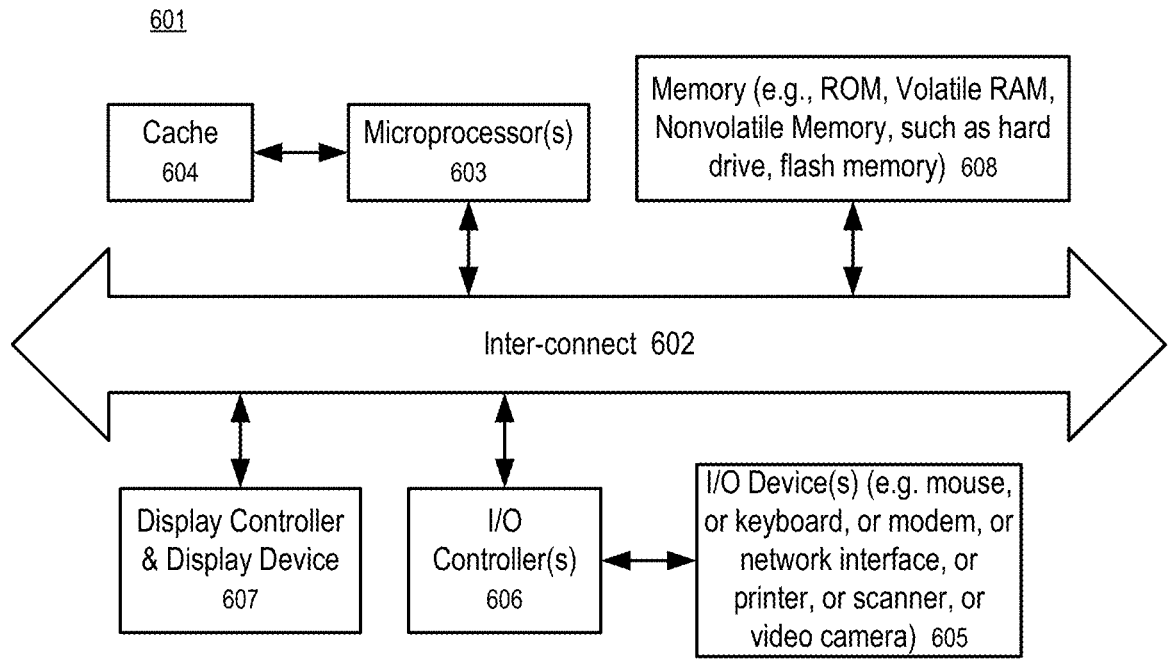
FIG. 6 shows a block diagram of a computing device (e.g., a network gateway, a network device, a monitoring server, or mobile device management (MDM) server) which can be used in various embodiments.

FIG. 6 shows a block diagram of a computing device 601 (e.g., a network gateway, a network device, an endpoint device, an identity provider, a monitoring server, or a mobile device management (MDM) server) which can be used in various embodiments. While FIG. 6 illustrates various components, it is not intended to represent any particular architecture or manner of interconnecting the components. Other systems that have fewer or more components may also be used. In an embodiment, a monitoring server, an administrator server, an authenticity server, or an identity provider may each reside on separate computing systems, or one or more may run on the same computing device, in various combinations.

In FIG. 6, computing device 601 includes an inter-connect 602 (e.g., bus and system core logic), which interconnects a microprocessor(s) 603 and memory 608. The microprocessor 603 is coupled to cache memory 604 in the example of FIG. 6.

The inter-connect 602 interconnects the microprocessor(s) 603 and the memory 608 together and also interconnects them to a display controller and display device 607 and to peripheral devices such as input/output (I/O) devices 605 through an input/output controller(s) 606. Typical I/O devices include, for example, mice, keyboards, modems, network interfaces, printers, scanners, and/or video cameras.

The inter-connect 602 may include one or more buses connected to one another through various bridges, controllers and/or adapters. In one embodiment the I/O controller 606 includes a USB (Universal Serial Bus) adapter for controlling USB peripherals, and/or an IEEE-1394 bus adapter for controlling IEEE-1394 peripherals.

The memory 608 may include ROM (Read Only Memory), and volatile RAM (Random Access Memory) and non-volatile memory, such as hard drive, flash memory, etc.

Volatile RAM is typically implemented as dynamic RAM (DRAM) which requires power continually to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the computing device. A non-volatile memory that is remote from the computing device, such as a network storage device coupled to the computing device through a network interface such as a modem or Ethernet interface, can also be used.

In one embodiment, a computing device as illustrated in FIG. 6 is used to implement one or more servers that provide a network gateway.

In another embodiment, a computing device as illustrated in FIG. 6 is used to implement a user terminal or a mobile device on which an application and/or endpoint agent is installed. A user terminal may be in the form, for example, of a notebook computer or a personal desktop computer.

In some embodiments, one or more servers can be replaced with the service of a peer-to-peer network of a plurality of data processing systems, or a network of distributed computing systems. The peer-to-peer network, or a distributed computing system, can be collectively viewed as a computing device.

Embodiments of the disclosure can be implemented via the microprocessor(s) 603 and/or the memory 608. For example, the functionalities described can be partially implemented via hardware logic in the microprocessor(s) 603 and partially using the instructions stored in the memory 608. Some embodiments are implemented using the microprocessor(s) 603 without additional instructions stored in the memory 608. Some embodiments are implemented using the instructions stored in the memory 608 for execution by one or more general purpose microprocessor(s) 603. Thus, the disclosure is not limited to a specific configuration of hardware and/or software.

Figure 7:
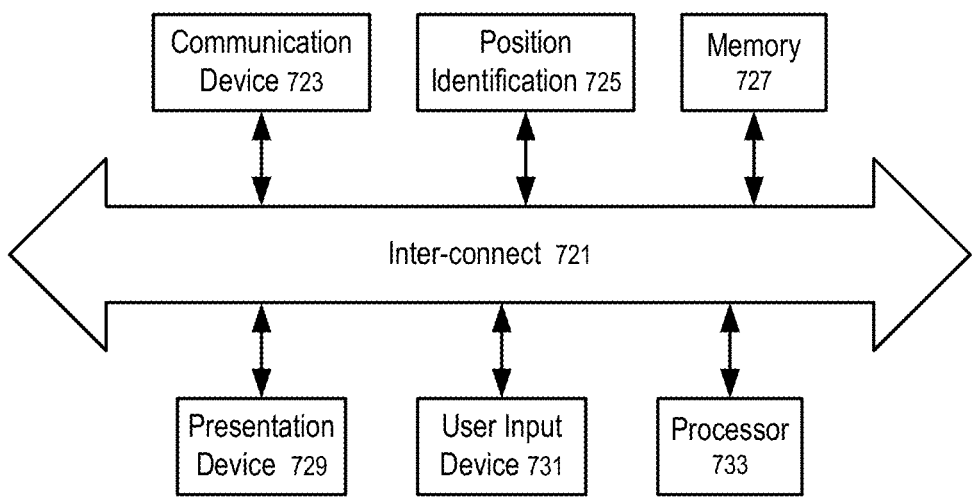
FIG. 7 shows a block diagram of a computing device (e.g., an endpoint device, a mobile device of a user, or a user terminal), according to one embodiment.

FIG. 7 shows a block diagram of a computing device (e.g., an endpoint device, a mobile device of a user, or a user terminal), according to one embodiment. In FIG. 7, the computing device includes an inter-connect 721 connecting the presentation device 729, user input device 731, a processor 733, a memory 727, a position identification unit 725 and a communication device 723.

In FIG. 7, the position identification unit 725 is used to identify a geographic location. The position identification unit 725 may include a satellite positioning system receiver, such as a Global Positioning System (GPS) receiver, to automatically identify the current position of the computing device.

In one embodiment, data regarding the geographic location may be part of the metadata gathered by the network gateway.

In FIG. 7, the communication device 723 is configured to communicate with a server to provide data, including application data (e.g., an application identifier and a source identifier for an application being downloaded). In one embodiment, the user input device 731 is configured to receive or generate user data or content. The user input device 731 may include a text input device, a still image camera, a video camera, and/or a sound recorder, etc.

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and/or operations may be described as being performed by or caused by software code to simplify description. However, those skilled in the art will recognize what is meant by such expressions is that the functions and/or operations result from execution of the code by one or more processing devices, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer-to-peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions. Other examples of computer-readable media include, but are not limited to, non-volatile embedded devices using NOR flash or NAND flash architectures. Media used in these architectures may include un-managed NAND devices and/or managed NAND devices, including, for example, eMMC, SD, CF, UFS, and SSD.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.). A "computer-readable medium" as used herein may include a single medium or multiple media (e.g., that store one or more sets of instructions).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
at least one computing device; and
memory storing instructions configured when executed to cause the at least one computing device to:
provide at least one communication interface, the communication interface configured to communicate over at least one network with a plurality of endpoint devices, wherein each endpoint device runs a respective endpoint agent, and wherein each endpoint agent is configured to gather metadata associated with its respective endpoint device and send the gathered metadata to a network gateway; and
implement the network gateway, wherein the network gateway is configured to:
receive, from a first endpoint agent, first metadata corresponding to a first endpoint device;
identify, based at least on the first metadata, a security risk; and
in response to identifying the security risk, perform at least one security action, wherein performing the security action comprises causing limiting or blocking of at least one process associated with the identified security risk, and wherein the process is limited or blocked on the first endpoint device and one or more other endpoint devices;
wherein performing the security action comprises:
determining a first software component installed or downloaded by the first endpoint device;
determining a second endpoint device that has installed or downloaded a second software component that is similar to the first software component within a comparison threshold; and
sending a signal to the second endpoint device that causes a second endpoint agent running on the second endpoint device to block execution of the second software component.

2. The system of claim 1, wherein the network gateway is further configured to receive, from a third endpoint agent, second metadata corresponding to a third endpoint device, wherein the security risk is identified further based on the second metadata.

3. The system of claim 1, wherein the network gateway is further configured to gather second metadata associated with the network, and the security risk is identified further based on the second metadata.

4. The system of claim 3, wherein at least one of the first metadata or the second metadata relates to data traffic on the network and includes at least one of:
source IP address, destination IP address, source port, destination port;

executable name for a process that is communicating on an endpoint device;

at least one observed or known risk for a process communicating on an endpoint device;

content or files that are being accessed by an endpoint device;

sensitive tokens or artifacts identified by a data loss prevention (DLP) engine associated with at least one of an endpoint device or the network gateway;

destination fully-qualified domain name (FQDN) being used by an endpoint device;

data regarding context of an endpoint device;

data regarding user attributes of an endpoint device; or data regarding process or application being used by an endpoint device.

5. The system of claim 3, wherein the at least one network comprises a plurality of network devices, and gathering at least one of the first or second metadata includes receiving the first or second metadata from at least one of the plurality of endpoint devices or the network devices.

6. The system of claim 5, wherein:

the network devices comprise at least one of a router, a firewall, a network switch, a forward proxy, or a reverse proxy; and the plurality of endpoint devices comprise at least one of desktops, laptops, smartphones, tablets, servers, workstations, or Internet-of-things (IoT) devices.

7. The system of claim 1, wherein the plurality of endpoint devices connect through the network gateway to remote computing devices.

8. The system of claim 7, wherein:

the network gateway is further configured to gather second metadata associated with one or more of the remote computing devices; and the security risk is identified further based on the second metadata.

9. The system of claim 1, wherein the security action is performed for a third endpoint device on a same network as the first endpoint device.

10. The system of claim 1, wherein performing the security action comprises sending a first signal to the first endpoint device, wherein the first endpoint agent of the first endpoint device is configured to, in response to receiving the first signal:

determine a first process running on the first endpoint device that is associated with the security risk; and block the first process.

11. The system of claim 1, wherein:

each endpoint agent of the plurality of endpoint devices is further configured to send respective process data characterizing at least one process to the network gateway; and the network gateway is further configured to, in response to receiving the process data, send a signal to a third endpoint device running a third endpoint agent, the signal causing the third endpoint agent to block one or more processes on the third endpoint device that correspond to the process data.

12. The system of claim 1, wherein the network gateway is further configured to perform an evaluation of at least one of network or application level traffic flowing through the network gateway, and the security risk is identified further based on the evaluation of the network or application level traffic.

13. The system of claim 1, wherein:

the first metadata includes data regarding a first process executing on the first endpoint device;

the first process is limited or blocked on the first endpoint device according to a first policy that applies to the first endpoint device; and the first process is limited or blocked on a third endpoint device according to a second policy that applies to the third endpoint device.

14. The system of claim 1, wherein the network gateway is further configured to:

gather metadata from a first set of endpoint devices;

after gathering the metadata from the first set of endpoint devices, gather metadata from a second set of endpoint devices;

identify a security risk based on the metadata gathered from the second set of endpoint devices; and in response to identifying the security risk based on the metadata gathered from the second set of endpoint devices, perform at least one security action for the first and second sets of endpoint devices.

15. The system of claim 1, wherein the network gateway is further configured to:

access a plurality of policies associated with the plurality of endpoint devices; and in response to identifying the security risk, determine policies associated with the first endpoint device and the other endpoint devices;

wherein the security action is performed for the first endpoint device and the other endpoint devices in accordance with the policies.

16. The system of claim 1, wherein:

the network gateway is further configured to implement at least one of a cloud access security broker (CASB), zero trust network access (ZTNA), or a secure web gateway (SWG); and the security action is performed in real-time after identifying the security risk.

17. A non-transitory computer-readable medium storing instructions which, when executed on at least one computing device configured to implement a network gateway, cause the at least one computing device to:

communicate with a plurality of endpoint agents running on endpoint devices, wherein the endpoint agents communicate with the network gateway using at least one internal network, and wherein each endpoint agent is configured to gather metadata associated with a respective endpoint device and send the gathered metadata to the network gateway;

receive, from at least one of the endpoint agents, first metadata;

gather second metadata associated with network traffic flowing through the network gateway, wherein the network traffic is associated with communications between the endpoint devices and at least one external computing device;

identify users associated with processes running on the endpoint devices;

identify, based at least on the first and second metadata, a first security risk for a first process associated with a first user of a first endpoint device; and in response to identifying the first security risk, limit or block the first process on the first endpoint device, and limit or block a second process on a second endpoint device, wherein the second process is similar to the first process within a comparison threshold.

18. The non-transitory computer-readable medium of claim 17, wherein the second metadata includes at least one of user name, user risk, or user group associations.

19. The non-transitory computer-readable medium of claim 17, wherein the instructions further cause the at least one computing device to:
- interrogate a computing device of an identity provider for the first user;
- based on the interrogation, determine at least one application that is active for the first user; and
- cause disabling of permission for access by the first user to the application on the first endpoint device.

20. A method for a network gateway wherein endpoint devices communicate with the network gateway using at least one network, the method comprising:
- communicating with a plurality of endpoint agents running on the endpoint devices, wherein each endpoint agent is configured to gather metadata associated with a respective endpoint device and send the gathered metadata to the network gateway;
- receiving, from at least one endpoint agent, first metadata;
- gathering second metadata associated with traffic on the at least one network;
- monitoring, based at least on the first and second metadata, for one or more policy violations by the endpoint devices, wherein the first and second metadata are gathered in real-time while performing the monitoring;
- identifying policy violations for a plurality of first endpoint devices;
- in response to identifying the policy violations, enforcing a respective policy for each of the first endpoint devices to remediate the policy violations;
- determining a first software component or process on at least one of the first endpoint devices;
- determining a second software component or process on a second endpoint device that is similar to the first software component or process within a comparison threshold; and
- causing the second endpoint device to limit or block the second software component or process.

21. A system comprising:
- at least one computing device; and
- memory storing instructions configured when executed to cause the at least one computing device to:
  - provide at least one communication interface, the communication interface configured to communicate over at least one network with a plurality of endpoint devices, wherein each endpoint device runs a respective endpoint agent, and wherein each endpoint agent is configured to gather metadata associated with its respective endpoint device and send the gathered metadata to an API mode cloud access security broker (CASB); and
  - implement the CASB, wherein the CASB is configured to:
    - receive, from a first endpoint agent, first metadata corresponding to a first endpoint device;
    - identify, based at least on the first metadata, a security risk; and
    - in response to identifying the security risk, perform at least one security action, wherein performing the security action comprises causing limiting or blocking of at least one first process associated with the identified security risk, and wherein the first process is limited or blocked on the first endpoint device and one or more other endpoint devices;
    - wherein performing the security action comprises determining a second process that is similar to the first process within a comparison threshold, and causing limiting or blocking of the second process on at least one endpoint device.

* * * * *